(12) United States Patent
Jang et al.

(10) Patent No.: US 9,526,089 B2
(45) Date of Patent: Dec. 20, 2016

(54) METHOD FOR TRANSMITTING CONTROL INFORMATION IN A WIRELESS COMMUNICATION SYSTEM, AND DEVICE THEREFOR

(75) Inventors: Jiwoong Jang, Anyang-si (KR); Jaehoon Chung, Anyang-si (KR); Seunghee Han, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 13/880,151

(22) PCT Filed: Oct. 24, 2011

(86) PCT No.: PCT/KR2011/007932
§ 371 (c)(1),
(2), (4) Date: Apr. 18, 2013

(87) PCT Pub. No.: WO2012/057480
PCT Pub. Date: May 3, 2012

(65) Prior Publication Data
US 2013/0208695 A1    Aug. 15, 2013

Related U.S. Application Data

(60) Provisional application No. 61/407,414, filed on Oct. 27, 2010, provisional application No. 61/407,892, (Continued)

(51) Int. Cl.
*H04W 4/00* (2009.01)
*H04W 72/04* (2009.01)
(Continued)

(52) U.S. Cl.
CPC ....... *H04W 72/0406* (2013.01); *H04B 7/0456* (2013.01); *H04B 7/063* (2013.01);
(Continued)

(58) Field of Classification Search
CPC ............................ H04B 7/0456; H04L 1/0026
(Continued)

(56) References Cited

U.S. PATENT DOCUMENTS 8,830,927 B2 *  9/2014  Lunttila ................ H04L 5/0007
                                                   370/329
8,831,042 B2 *  9/2014  Kim ......................... H04B 1/69
                                                   370/344
(Continued)

FOREIGN PATENT DOCUMENTS

WO    WO 2010016698 A2 *  2/2010
WO        2010/101414         9/2010
WO    WO 2011158921 A1 * 12/2011

OTHER PUBLICATIONS

Lee, et al., "MIMO Technologies in 3GPP LTE and LTE-Advanced," EURASIP Journal on Wireless Communications and Networking, vol. 2009, Article ID 302092, May 2009, 10 pages.
(Continued)

*Primary Examiner* — Guang Li
(74) *Attorney, Agent, or Firm* — Lee Hong Degerman Kang Waimey

(57) ABSTRACT

The present invention discloses a method for a terminal to transmit control information in a wireless communication system. The method includes encoding a plurality of pieces of control information and transmitting the plurality of encoded control information and data information through a data channel. During the encoding of the plurality of control information, a channel quality indicator (CQI) and a precoding matrix index (PMI) for an entire frequency band are encoded jointly or separately, and each piece of the plurality of pieces of encoded control information and the data information is mapped into a resource block of the data channel, and is then transmitted.

9 Claims, 22 Drawing Sheets

Related U.S. Application Data filed on Oct. 28, 2010, provisional application No. 61/407,451, filed on Oct. 28, 2010, provisional application No. 61/409,911, filed on Nov. 3, 2010, provisional application No. 61/409,977, filed on Nov. 4, 2010.

(51) Int. Cl.
| | | |
|---|---|---|
| H04L 1/00 | (2006.01) | |
| H04L 1/06 | (2006.01) | |
| H04L 5/00 | (2006.01) | |
| H04B 7/04 | (2006.01) | |
| H04B 7/06 | (2006.01) | |

(52) U.S. Cl.
CPC ........... *H04B 7/066* (2013.01); *H04B 7/0632* (2013.01); *H04B 7/0639* (2013.01); *H04L 1/003* (2013.01); *H04L 1/0026* (2013.01); *H04L 1/0027* (2013.01); *H04L 1/0031* (2013.01); *H04L 1/0072* (2013.01); *H04L 1/06* (2013.01); *H04L 5/0007* (2013.01); *H04L 5/0053* (2013.01); *H04L 5/0057* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 8,958,494 | B2* | 2/2015 | Beluri | H04B 7/0417 375/260 |
| 9,326,277 | B2* | 4/2016 | Heo | H04L 5/001 |
| 2009/0006925 | A1* | 1/2009 | Pan | 714/758 |
| 2009/0067391 | A1* | 3/2009 | Shen | H04L 1/0027 370/336 |
| 2009/0207797 | A1 | 8/2009 | Shen et al. | |
| 2009/0245170 | A1* | 10/2009 | Zhang | H04L 5/0053 370/328 |
| 2009/0262695 | A1* | 10/2009 | Chen | H04L 5/0053 370/329 |
| 2009/0285193 | A1 | 11/2009 | Kim et al. | |
| 2009/0296644 | A1* | 12/2009 | Cheon et al. | 370/329 |
| 2010/0027456 | A1* | 2/2010 | Onggosanusi | H04B 7/024 370/312 |
| 2010/0074316 | A1 | 3/2010 | Kim et al. | |
| 2010/0195624 | A1* | 8/2010 | Zhang et al. | 370/335 |
| 2010/0238984 | A1* | 9/2010 | Sayana et al. | 375/219 |
| 2010/0239040 | A1* | 9/2010 | Beluri et al. | 375/267 |
| 2011/0081902 | A1* | 4/2011 | Seo | H04L 5/0023 455/423 |
| 2011/0092240 | A1* | 4/2011 | Aiba | H04L 1/0025 455/509 |
| 2011/0128942 | A1* | 6/2011 | Kim | H04B 7/0632 370/336 |
| 2011/0141926 | A1* | 6/2011 | Damnjanovic et al. | 370/252 |
| 2011/0149717 | A1* | 6/2011 | Dai et al. | 370/206 |
| 2011/0170625 | A1* | 7/2011 | Blankenship et al. | 375/295 |
| 2011/0205981 | A1* | 8/2011 | Koo et al. | 370/329 |
| 2011/0243012 | A1* | 10/2011 | Luo | H04L 5/0055 370/252 |
| 2011/0249578 | A1* | 10/2011 | Nayeb Nazar | H04L 1/0027 370/252 |
| 2011/0268045 | A1* | 11/2011 | Heo et al. | 370/329 |
| 2011/0268048 | A1* | 11/2011 | Toskala et al. | 370/329 |
| 2011/0280222 | A1* | 11/2011 | Nam | H04L 1/0031 370/335 |
| 2011/0310855 | A1* | 12/2011 | Yin et al. | 370/336 |
| 2012/0039287 | A1* | 2/2012 | Ko | H04L 5/0053 370/329 |
| 2012/0082157 | A1* | 4/2012 | Yamada et al. | 370/389 |
| 2012/0087254 | A1* | 4/2012 | Yin et al. | 370/252 |
| 2012/0099553 | A1* | 4/2012 | Aiba et al. | 370/329 |
| 2012/0140698 | A1* | 6/2012 | Noh | H04B 7/2606 370/315 |
| 2013/0077595 | A1* | 3/2013 | Aiba | H04L 1/0041 370/329 |

OTHER PUBLICATIONS

PCT International Application No. PCT/KR2011/007932, Written Opinion of the International Searching Authority dated Apr. 4, 2012, 15 pages.

\* cited by examiner

FIG. 5
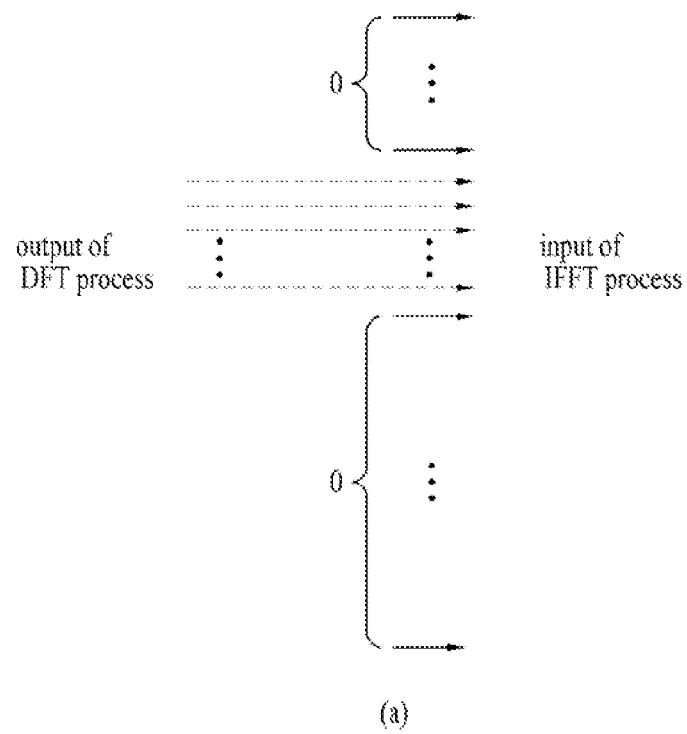
(a)
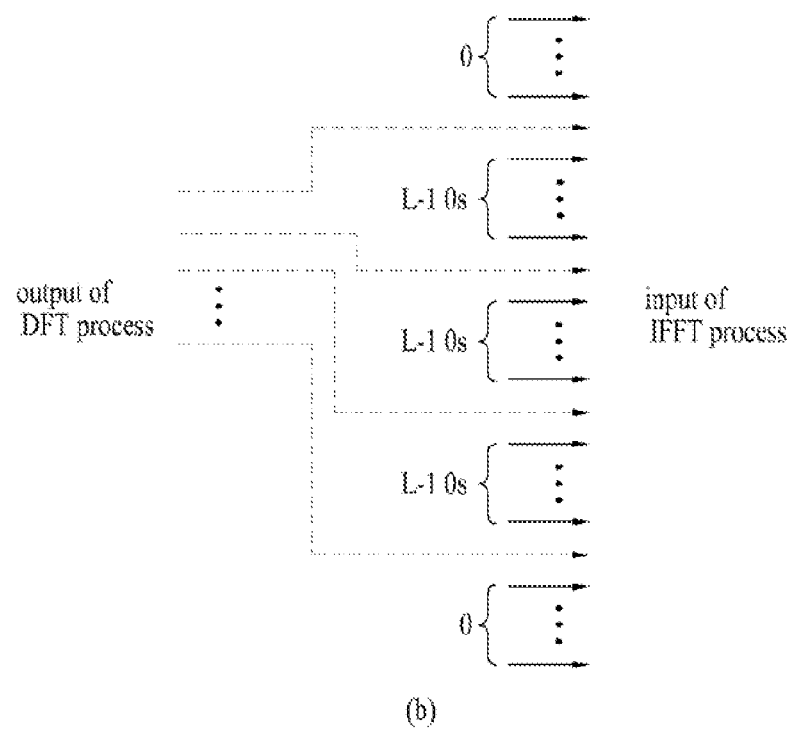
(b)

FIG. 14
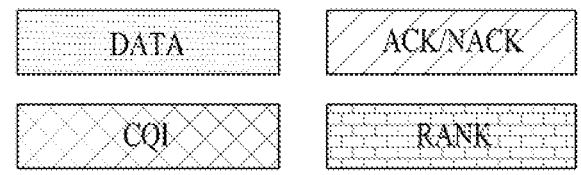
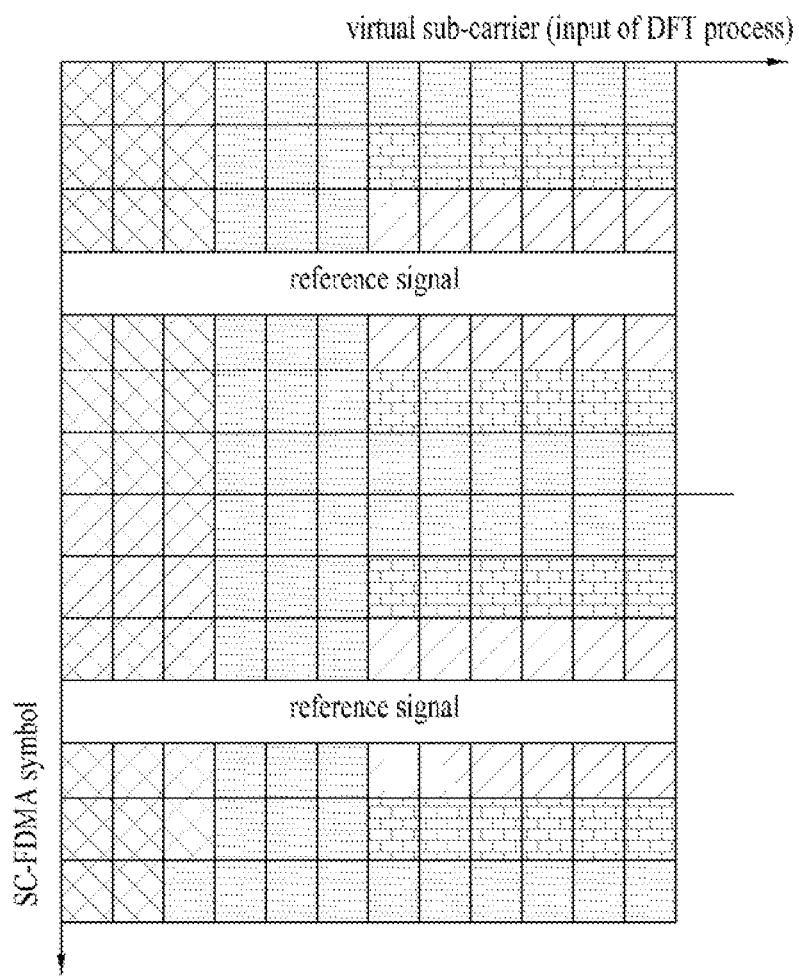

METHOD FOR TRANSMITTING CONTROL INFORMATION IN A WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2011/07932, filed on Oct. 24, 2011, which claims the benefit of U.S. Provisional Application Ser. No. 61/407,414, filed on Oct. 27, 2010, U.S. Provisional Application Ser. No. 61/407,451, filed on Oct. 28, 2010, U.S. Provisional Application Ser. No. 61/407,892, filed on Oct. 28, 2010, U.S. Provisional Application Ser. No. 61/409,911, filed on Nov. 3, 2010, and U.S. Provisional Application Ser. No. 61/409,977, filed on Nov. 4, 2010, the contents of which are all hereby incorporated by reference herein in their entirety.

FIELD OF THE INVENTION

The present invention relates to a wireless communication system, and more particularly, to a method of transmitting a control information in a wireless communication system and an apparatus therefor.

BACKGROUND ART

In a mobile communication system, a user equipment is able to receive information from a base station in downlink and the user equipment is able to transmit information in uplink as well. The information transmitted/received by the user equipment includes a data and various control informations. Various physical channels may exist according to a kind and usage of the information transceived by the user equipment.

FIG. 1 is a diagram for explaining physical channels used for 3GPP (3rd generation partnership project) LTE (long term evolution) system and a method of a signal transmission using the same.

If a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment, which does not complete an access to a base station, may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access except a handover case, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure.

FIG. 2 is a diagram for describing a signal processing process for a user equipment to transmit a UL signal.

First of all, in order to transmit a UL signal, a scrambling module 210 of a user equipment may be able to scramble a transmission signal using a UE-specific scrambling signal. This scrambled signal is inputted to a modulating mapper 220 and is then modulated into a complex symbol by BPSK (binary phase shift keying), QPSK (quadrature phase shift keying) or 16 QAM (quadrature amplitude modulation) in accordance with a type and/or channel state of the transmission signal. Subsequently, the complex symbol is processed by a transform precoder 230 and is then inputted to a resource element mapper 240. In this case, the resource element mapper 240 may be able to map the complex symbol to a time-frequency resource element, which shall be used for practical transmission. This processed signal is inputted to an SC-FDMA signal generator 250 and may be then transmitted to a base station via antenna.

FIG. 3 is a diagram for describing a signal processing process for a base station to transmit a DL signal.

In 3GPP LTE system, a base station may be able to transmit at least one codeword in DL. Hence, each of the at least one codeword can be processed into a complex symbol by a scrambling module 301 and a modulating mapper 302. The complex symbol may be then mapped to a plurality of layers by a layer mapper 303. Each of a plurality of the layers may be then assigned to each transmitting antenna by being multiplied by a prescribed precoding matrix selected by a precoding module 304 in accordance with a channel state. A per-antenna transmission signal processed in the above manner is mapped to a time-frequency resource element by each resource element mapper 305, enters an OFDM (orthogonal frequency division multiple access) signal generator 306, and may be then transmitted via a corresponding antenna.

In case that a user equipment transmits a signal in UL, PAPR (peak-to-average power ratio) may cause a more considerable problem than a case that a base station transmits a signal in DL in a mobile communication system. Thus, as mentioned earlier in relation to FIG. 2 and FIG. 3, unlike OFDMA scheme used for transmitting a DL signal, SC-FDMA (single carrier-frequency division multiple access) scheme is used for transmitting a UL signal.

FIG. 4 is a diagram for describing a SC-FDMA scheme for a UL signal transmission and OFDMA scheme for a DL signal transmission in a mobile communication system.

Referring to FIG. 4, a user equipment for a UL signal transmission and a base station for a DL signal transmission are identical to each other in including a serial-to-parallel converter 401, a subcarrier mapper 403, an M-point IDFT module 404 and a CP (cyclic prefix) adding module 406.

Yet, a user equipment transmitting a signal by SC-FDMA scheme may additionally include a parallel-to-serial converter 405 and an N-point DFT module 402. In particular, the N-point DFT module 402 enables a transmission signal to have a single carrier property by canceling out an IDFT processing effect of the M-point IDFT module 404. FIG. 5 is a diagram for describing a signal mapping scheme in frequency domain to meet a single carrier property in the frequency domain. FIG. 5(a) indicates a localized mapping scheme and FIG. 5(b) indicates a distributed mapping scheme. The localized mapping scheme is currently defined by 3GPP LTE system.

Meanwhile, a clustered SC-FDMA, which is a modified form of SC-FDMA, is described. According to the clustered SC-FDMA, DFT process output samples in a subcarrier mapping process are divided into subgroups and the subgroups are discontinuously mapped to subcarrier regions, respectively. Occasionally, the clustered SC-FDMA may include a filtering process and a cyclic extension process.

In this case, the subgroup may be named a cluster. And, the cyclic extension may mean that a guard interval longer than a maximum delay spread of a channel is inserted between contiguous symbols to prevent mutual inter-symbol interference (ISI) while each subcarrier symbol is carried on a multi-path channel.

DISCLOSURE OF THE INVENTION

Technical Problem

Accordingly, the present invention is directed to substantially obviate one or more problems due to limitations and disadvantages of the related art. First of all, one object of the present invention is to provide a method of transmitting control information in a wireless communication system and an apparatus therefore.

Another object of the present invention is to provide a resource allocation, a channel coding, a transmission structure and a common/individual coding scheme for UCI and precoding index $W_1$, $W_2$ in case that the UCI is multiplexed by PUSCH. The method and apparatus proposed by the present invention can be applied to both MIMO environment and a single antenna environment.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described according to one embodiment of the present invention a method of transmitting a control information includes the steps of coding a plurality of control information and transmitting a plurality of the coded control information and a data information via a data channel, wherein CQI (channel quality indicator) and PMI (precoding matrix index) for a whole frequency band are separately coded with each other in the coding step and wherein each of a plurality of the coded control information and the data information are transmitted to a resource block of the data channel in a manner of being mapped.

The PMI for a whole frequency band and an RI (rank indicator) are jointly coded in the coding step and the jointly coded RI and the PMI for a whole frequency band are mapped to a time domain pre-defined for the RI in the resource block.

Selectively, the PMI for a whole frequency band and an RI (rank indication) are separately coded with each other in the coding step. As a $1^{st}$ embodiment, the separately coded PMI for a whole frequency band is mapped to time domains pre-defined for the RI in the resource block. As a $2^{nd}$ embodiment, the separately coded PMI for a whole frequency band is mapped to time domains except the time domains pre-defined for the RI among the time domains of the resource block. As a $3^{rd}$ embodiment, the separately coded PMI for a whole frequency band is mapped to frequency domains in the vicinity of a specific frequency domain to which the CQI is mapped thereto among the resource block. As a $4^{th}$ embodiment, the separately coded PMI for a whole frequency band is mapped to time domains to which the RI, ACK/NACK information, and a reference signal are not mapped thereto among the resource block and the separately coded PMI for a whole frequency band is sequentially mapped in the frequency-rising direction. As a $5^{th}$ embodiment, the separately coded PMI for a whole frequency band is mapped to a $7^{th}$ and an $8^{th}$ time domain.

In particular, PMI for a sub frequency band and the CQI may be jointly coded in the coding step.

The data channel may be a physical uplink shared channel (PUSCH).

To further achieve these and other advantages and in accordance with the purpose of the present invention according to a different embodiment a communication device transmitting a control information includes a processor configured to transmit a plurality of control information and an RF module configured to transmit a plurality of the coded control information and a data information via a data channel, wherein the processor is configured to separately code CQI (channel quality indicator) and PMI (precoding matrix index) for a whole frequency band with each other and wherein the RF module is configured to transmit each of a plurality of the coded control information and the data information to a resource block of the data channel in a manner of mapping.

Advantageous Effects

Accordingly, a transmitting end is able to code a control information according to the present invention in a wireless communication system.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for describing a signal mapping scheme in frequency domain to meet a single carrier property in the frequency domain;

FIG. 14 is a diagram for explaining a physical resource mapping method to transmit a UL data and a control channel;

MODE FOR INVENTION

In the following description, compositions of the present invention, effects and other characteristics of the present invention can be easily understood by the preferred embodiments of the present invention explained with reference to the accompanying drawings. Embodiments explained in the following description are examples of the technological features of the present invention applied to the system using a plurality of orthogonal subcarriers. For clarity, the present invention is explained using IEEE 802.16 system, which is exemplary only. The embodiments of the present invention are applicable to various communication systems including 3GPP ($3^{rd}$ generation partnership project) system.

In particular, specific terminologies used in the following description are provided to help understanding of the present invention. Various modifications and variations can be made in using the specific terminology without departing from the scope of the present invention.

Figure 6:
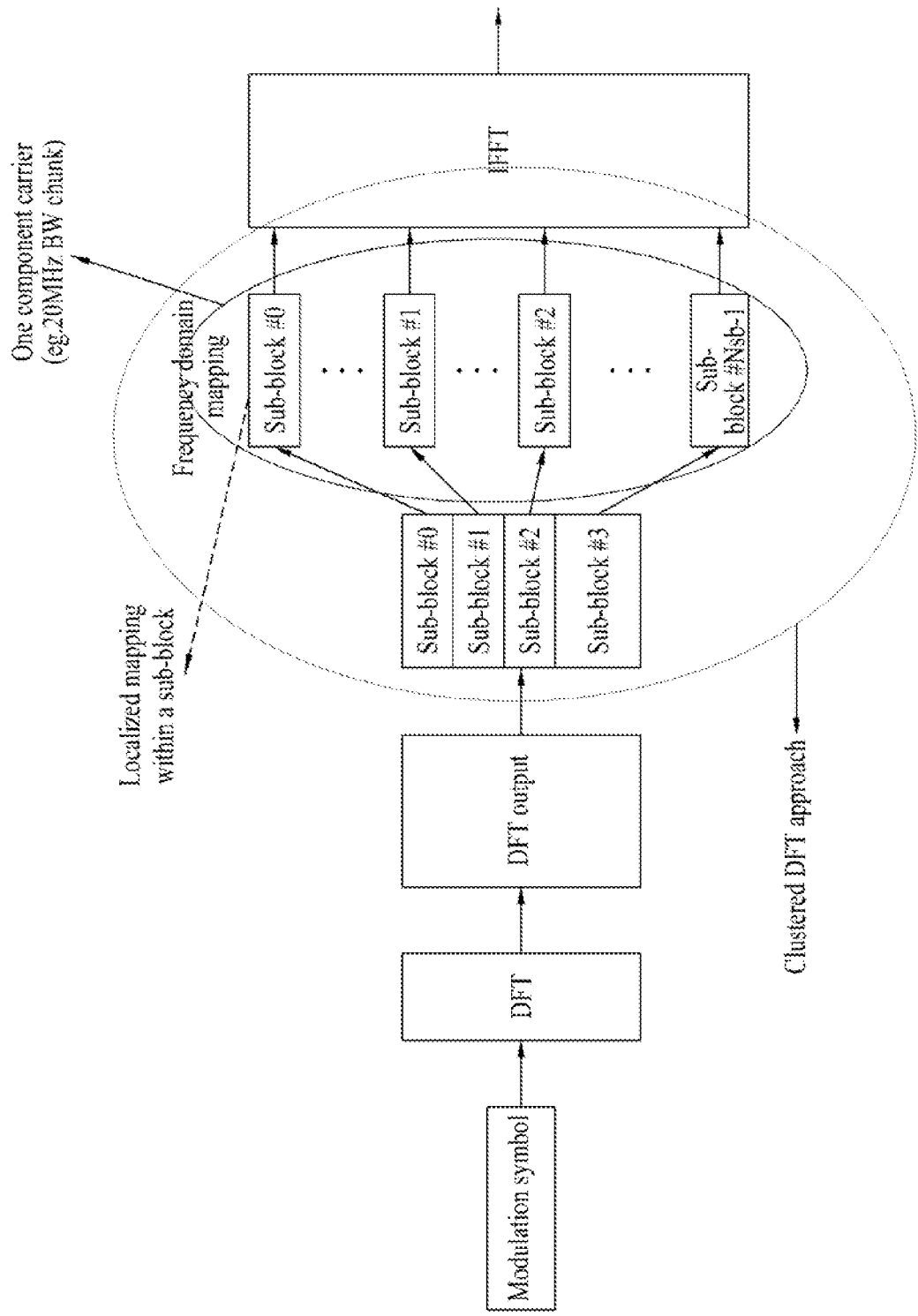
FIG. 6 is a diagram for describing a signal processing process of a clustered SC-FDMA that DFT process output samples map to a single carrier according to one embodiment of the present invention.
Figure 7:
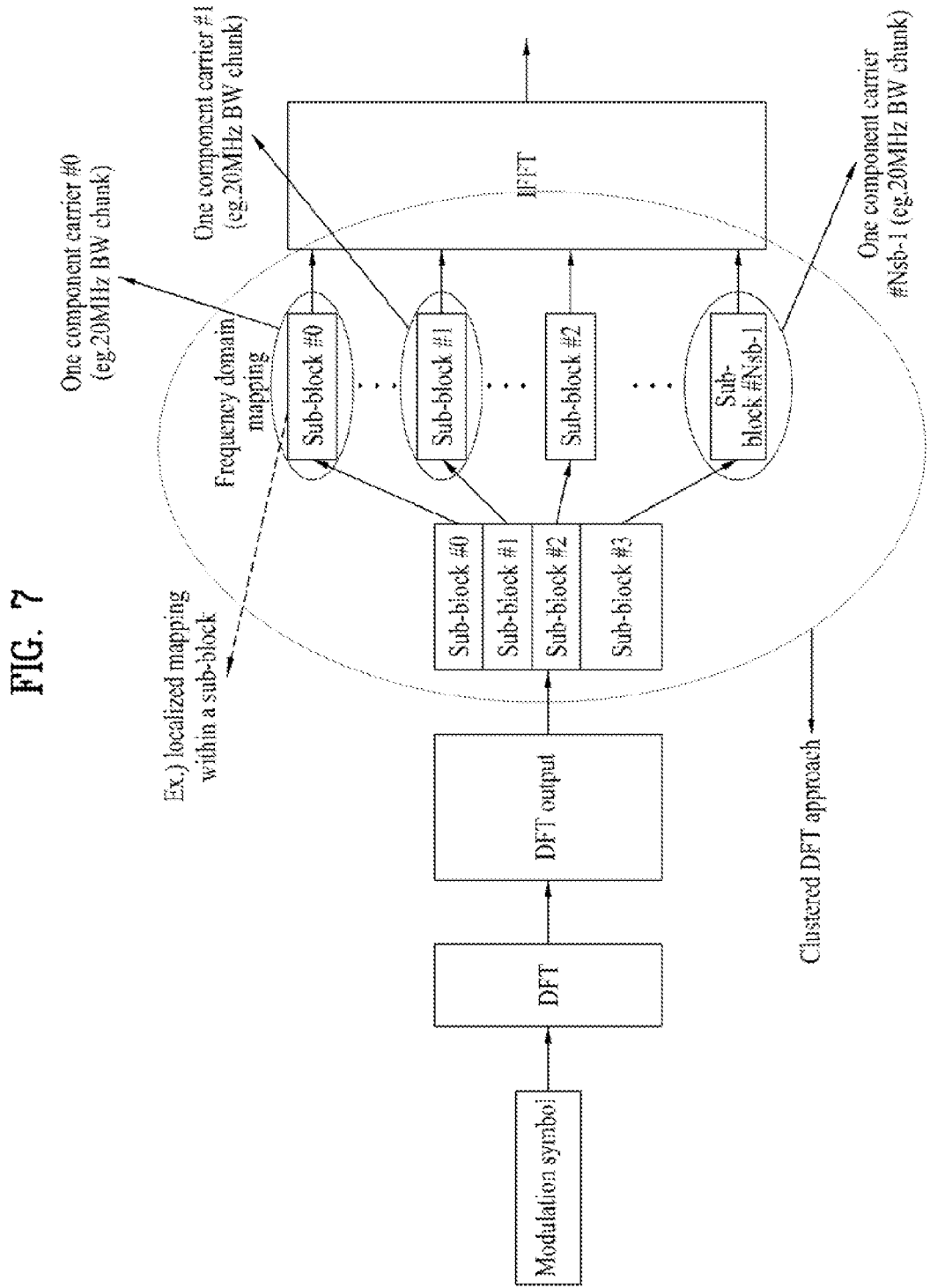
FIG. 7 and FIG. 8 are diagrams for describing a signal processing process of a clustered SC-FDMA that DFT process output samples map to a multi-carrier according to one embodiment of the present invention.

FIG. 6 is a diagram for describing a signal processing process of a clustered SC-FDMA that DFT process output samples map to a single carrier according to one embodiment of the present invention. And, FIG. 7 and FIG. 8 are diagrams for describing a signal processing process of a clustered SC-FDMA that DFT process output samples map to a multi-carrier according to one embodiment of the present invention.

Figure 1:
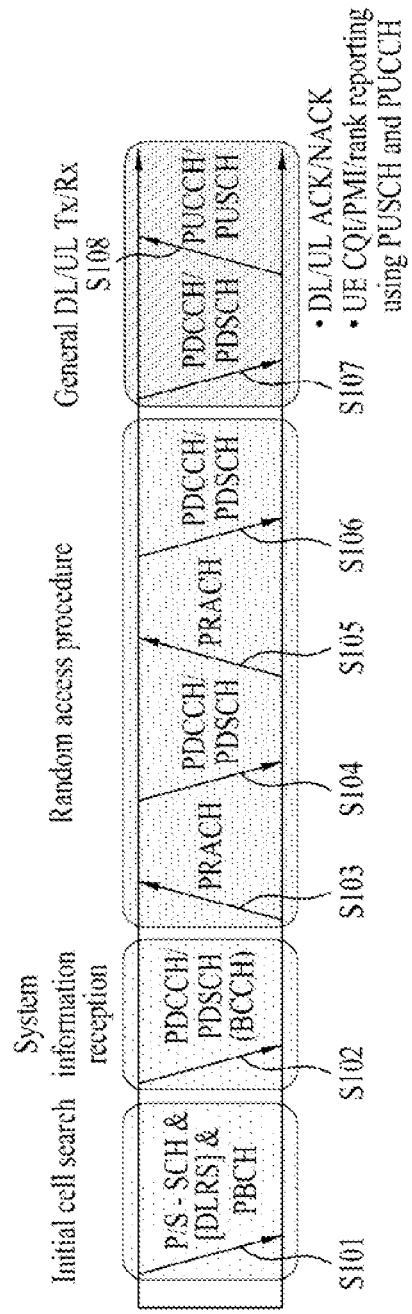
FIG. 1 is a diagram for explaining physical channels used for 3GPP LTE system and a method of signal transmission using the same.
Figure 2:
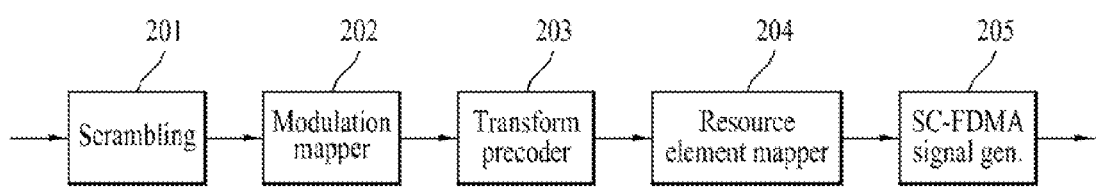
FIG. 2 is a diagram for describing a signal processing process for a user equipment to transmit a UL signal.
Figure 3:
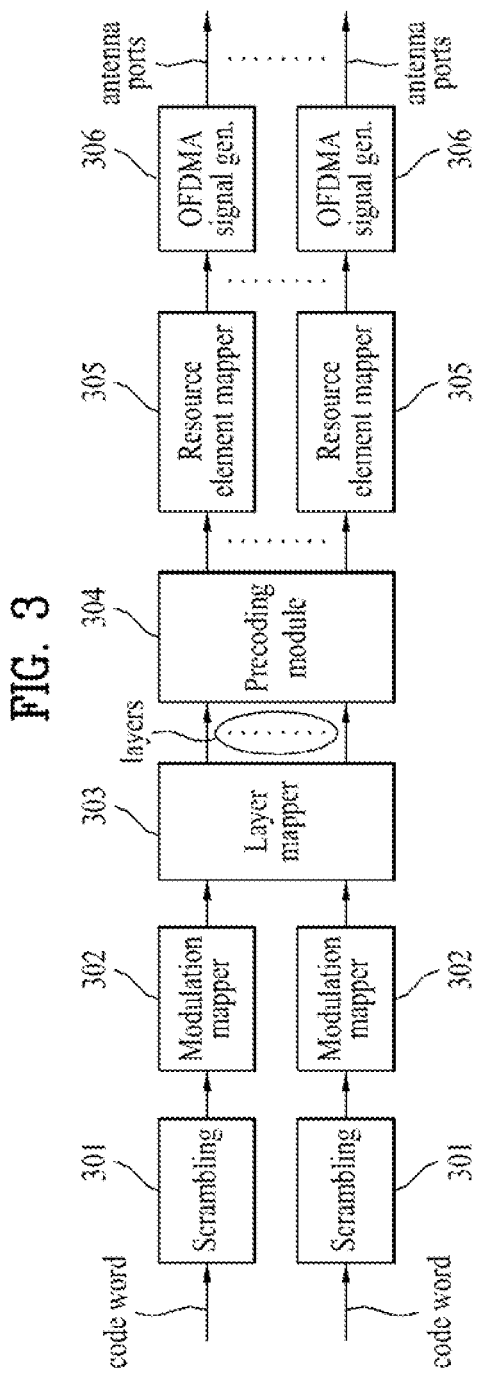
FIG. 3 is a diagram for describing a signal processing process for a base station to transmit a DL signal.
Figure 4:
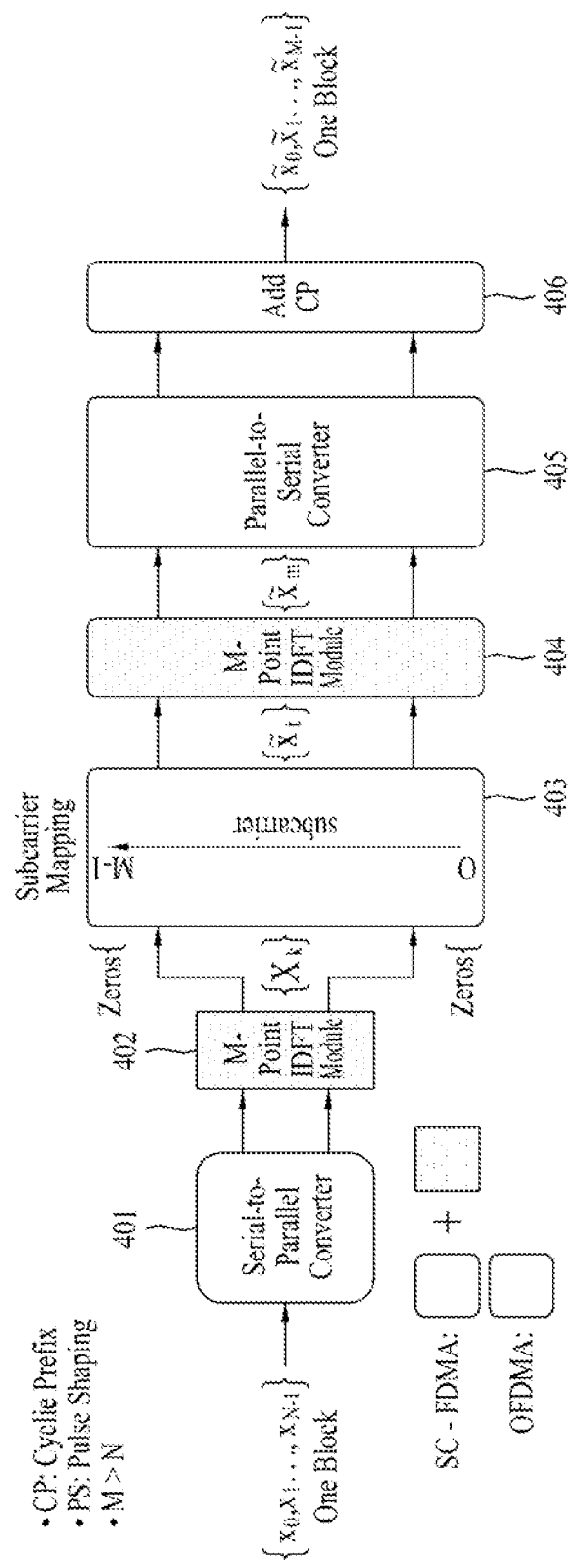
FIG. 4 is a diagram for describing a SC-FDMA scheme for a UL signal transmission and OFDMA scheme for a DL signal transmission in a mobile communication system.
Figure 8:
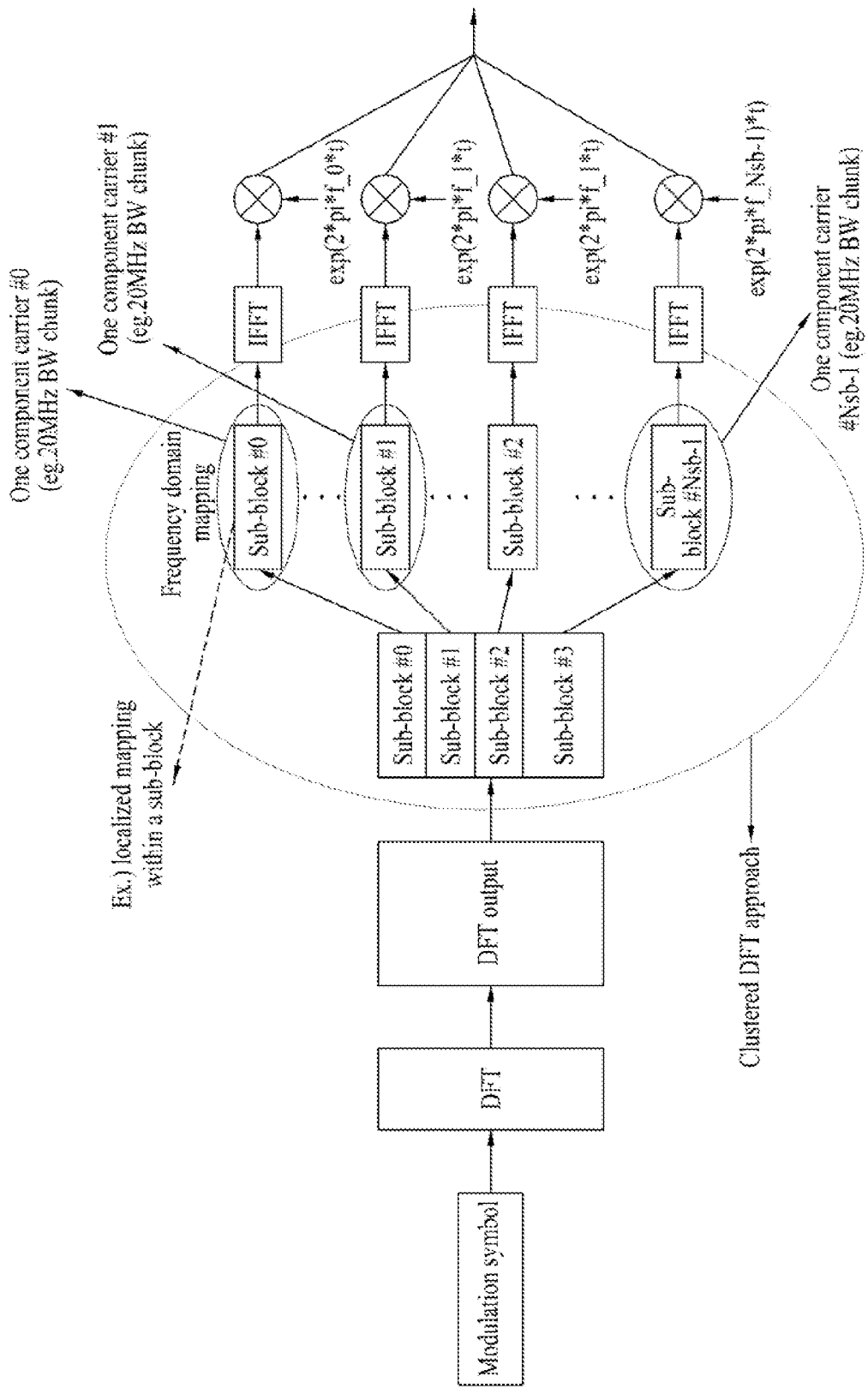

FIG. 6 corresponds to an example of applying a clustered SC-FDMA in an intra-carrier and FIG. 1 and FIG. 8 corresponds to an example of applying a clustered SC-FDMA in an inter-carrier. In particular, FIG. 7 indicates a case that a signal is generated via a single IFFT block in case that a subcarrier space between adjacent component carriers is arranged in a situation of which contiguous component carriers are assigned to frequency domain. FIG. 8 indicates a case that a signal is generated via a plurality of IFFT blocks since component carriers are not adjacent with each other in a situation of which the component carriers are non-contiguously assigned to frequency domain.

Figure 9:
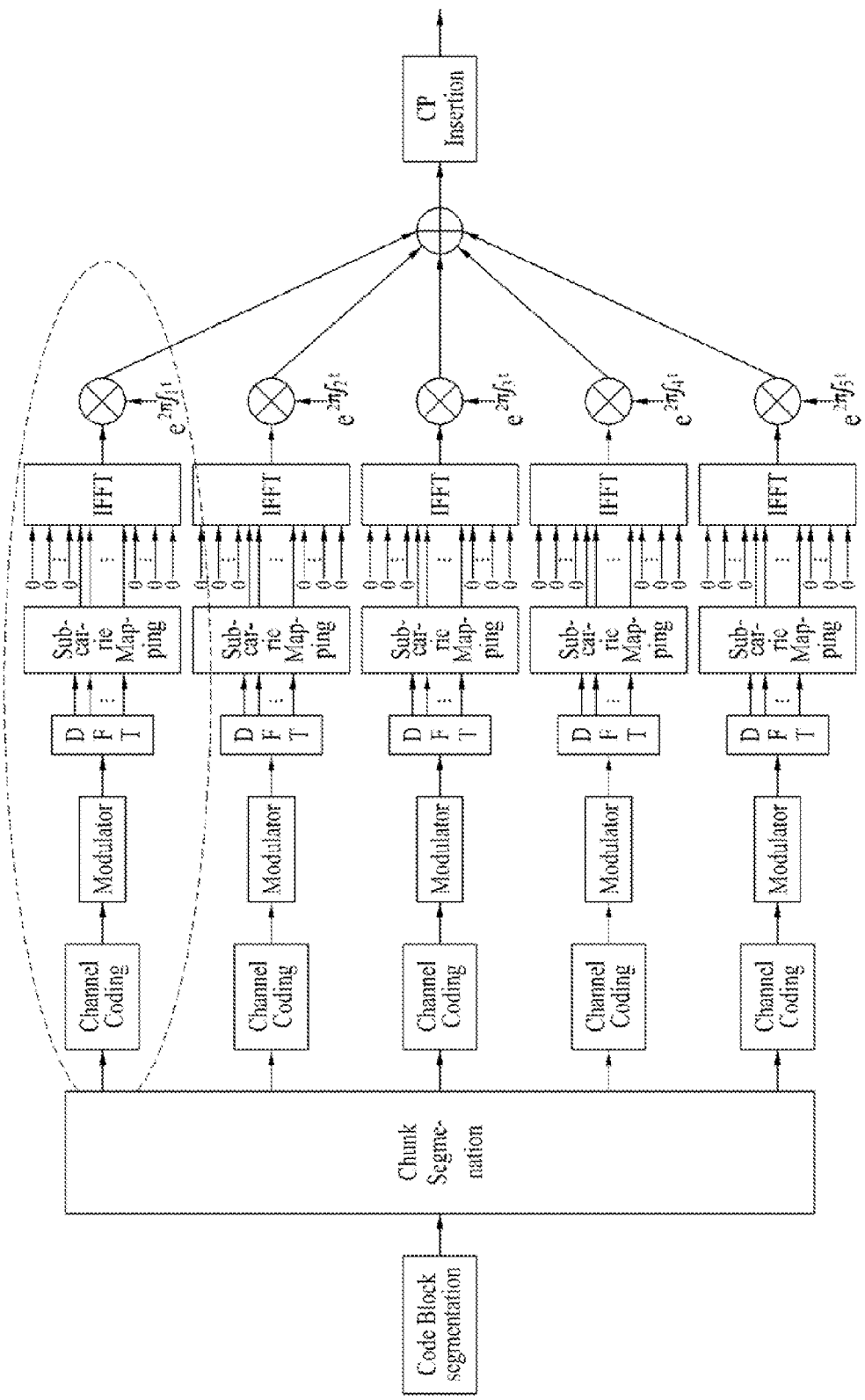
FIG. 9 is a diagram for describing a signal processing process of a segmented SC-FDMA system according to one embodiment of the present invention.

The segmented SC-FDMA may simply extend a DFT spreading of the conventional SC-FDMA and a frequency subcarrier mapping configuration of IFFT because a configuration related between DFT and IFFT has a one-to-one relation by applying IFFTs of which number is equal to an arbitrary number of DFTs. This is called NxSCFDMA or NxDFT-s-OFDMA, which may be named segmented SC-FDMA for clarity of the following description. FIG. 9 is a diagram for describing a signal processing process of a segmented SC-FDMA system according to one embodiment of the present invention. Referring to FIG. 9, the segmented SC-FDMA may be characterized in performing a DFP process by a group unit in a manner of binding all time-domain modulated symbols into N groups (N is an integer greater than 1) to mitigate a single carrier property condition.

Figure 10:
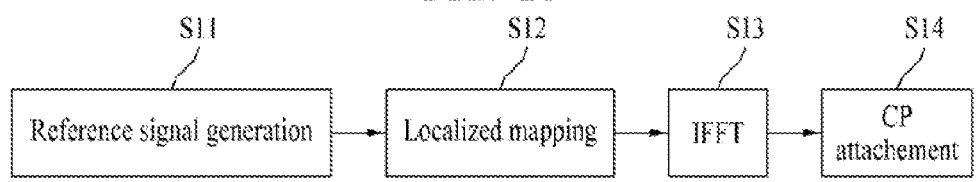
FIG. 10 is a diagram for describing a signal processing process to transmit a reference signal (hereinafter abbreviated RS) in UL.

FIG. 10 is a diagram for describing a signal processing process to transmit a reference signal (hereinafter abbreviated RS) in UL. Referring to FIG. 10, data is transmitted in a following manner. First of all, a signal is generated in time domain, transformed by a DFT precoder, mapped in frequency domain, and then transmitted via IFFT. Yet, a reference signal is directly generated in frequency domain by skipping a step of entering the DFT precoder. In particular, the reference signal is directly generated in the frequency domain [S11], undergoes a localized mapping step S12, an IFFT step S13 and a CP (cyclic prefix) attaching step S14 sequentially, and is then transmitted.

Figure 11:
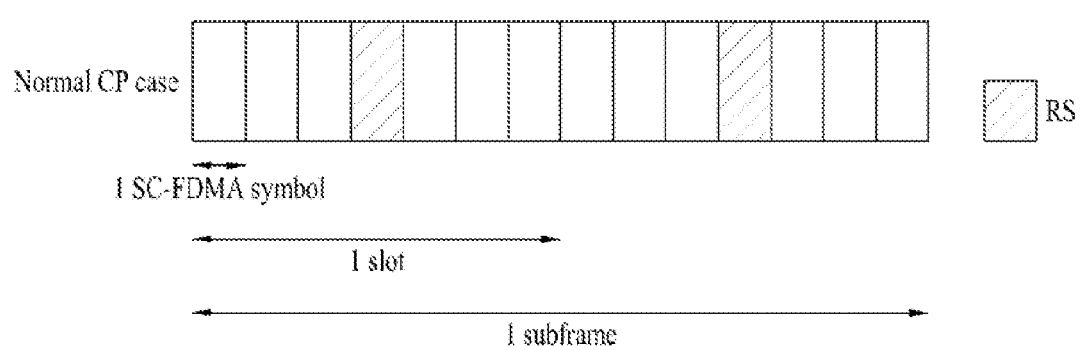
FIG. 11 is a diagram of a subframe structure to transmit an RS in case of a normal cyclic prefix (CP)
Figure 12:
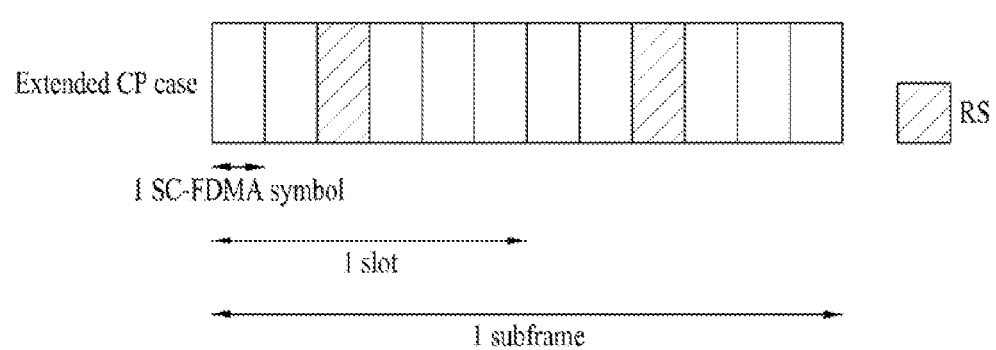
FIG. 12 is a diagram of a subframe structure to transmit an RS in case of an extended cyclic prefix (CP)

FIG. 11 is a diagram of a subframe structure to transmit an RS in case of a normal cyclic prefix (CP) and FIG. 12 is a diagram of a subframe structure to transmit an RS in case of an extended cyclic prefix (CP). Referring to FIG. 11, a reference signal is carried on $4^{th}$ OFDM symbol and $11^{th}$ OFDM symbol. Referring to FIG. 12, a reference signal is carried on $3^{rd}$ OFDM symbol and $9^{th}$ OFDM symbol.

Figure 13:
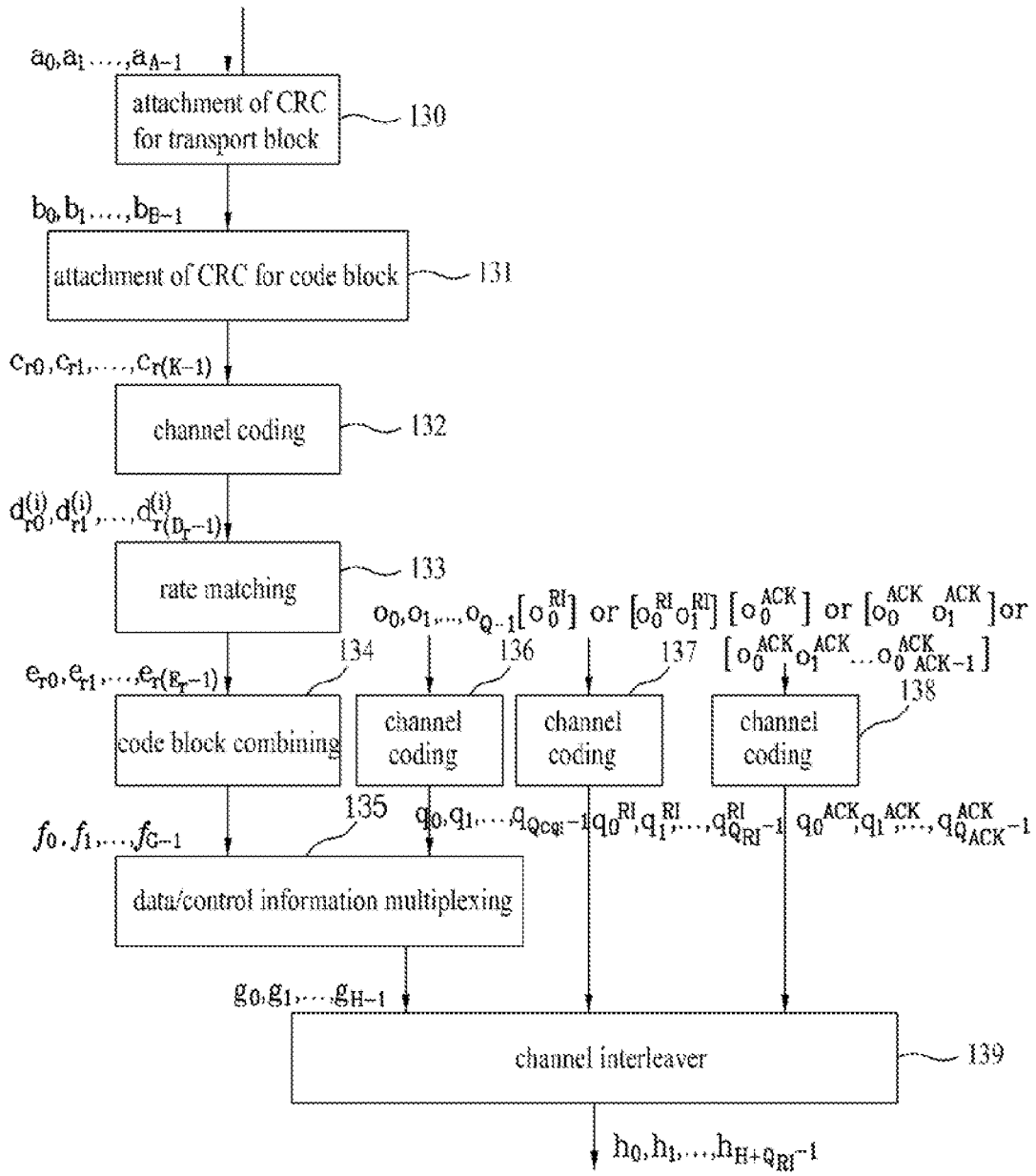
FIG. 13 is a block diagram for describing a process of a transmitting channel for a UL shared channel.

Meanwhile, a processing structure of an uplink shared channel as a transmitting channel is described as follows. FIG. 13 is a block diagram for describing a process of a transmitting channel for a UL shared channel. Referring to FIG. 13, data information multiplexed together with control information is transmitted in a following manner. First of all, CRC (cyclic redundancy check) for TB (transport block) is attached to a transport block (hereinafter abbreviated TB), which should be transmitted in UL [S130], the information is divided into a plurality of code blocks (hereinafter abbreviated CB) according to a size of the TB, and CRC for the CB is attached to a plurality of the CBs [S131]. According to a result value of the aforementioned process, a channel coding is performed [S132]. Moreover, after a channel coded data goes through a rate matching [S133], a combination between the CBs is performed again [S134]. These combined CBs are multiplexed with CQI/PMI (channel quality information/precoding matrix index) [S135].

Meanwhile, a channel coding on the CQI/PMI is performed on the sidelines of the data [S136]. The channel coded CQI/PMI is multiplexed with the data [S135].

And, a channel coding on an RI (rank indication) is performed on the sidelines of the data as well [S137].

In case of ACK/NACK (acknowledgement/negative acknowledgement), a channel coding is performed on the sidelines of the data, CQI, PMI and RI [S138]. An output signal is generated in a manner of interleaving the multiplexed data, the CQI/PMI, the separately channel coded RI and ACK/NACK [S139].

Meanwhile, a physical resource element (hereinafter abbreviated RE) for data and control channel in an LTE UL system is explained in the following description.

FIG. 14 is a diagram for explaining a physical resource mapping method to transmit a UL data and a control channel.

Referring to FIG. 14, CQI/PMI and the data are mapped to an RE by a time-first scheme. An encoded ACK/NACK is inserted in the vicinity of a demodulation reference signal (DM RS) in a manner of being punctured. And, an RI is mapped to an RE next to the RE at which the ACK/NACK is situated. The resource for the RI and the ACK/NACK may be able to occupy maximum 4 SC-FDMA symbols. In case that data and control information are transmitted to an UL shared channel at the same time, a mapping is performed in the following order; RI, concatenation of CQI/PMI and data, and ACK/NACK. In particular, the RI is mapped first and then the concatenation of CQI/PMI and data is mapped to the rest of REs except the RE to which the RI is mapped by the time-first scheme. The ACK/NACK is mapped in a manner of puncturing the concatenation of CQI/PMI and data, which is already mapped.

As mentioned in the foregoing description, by multiplexing an uplink control information (UCI) such as CQI/PMI and the like, a single carrier property can be satisfied. Hence, an uplink transmission maintaining a low CM (cubic metric) can be achieved.

In a system (e.g., LTE Rel-10) by which a legacy system is enhanced, at least one transmission scheme of a SC-FDMA and a clustered DFTs OFDMA can be applied to each user equipment on each of component carriers to perform a UL transmission and can be applied together with an UL-MIMO (uplink-MIMO).

Figure 15:
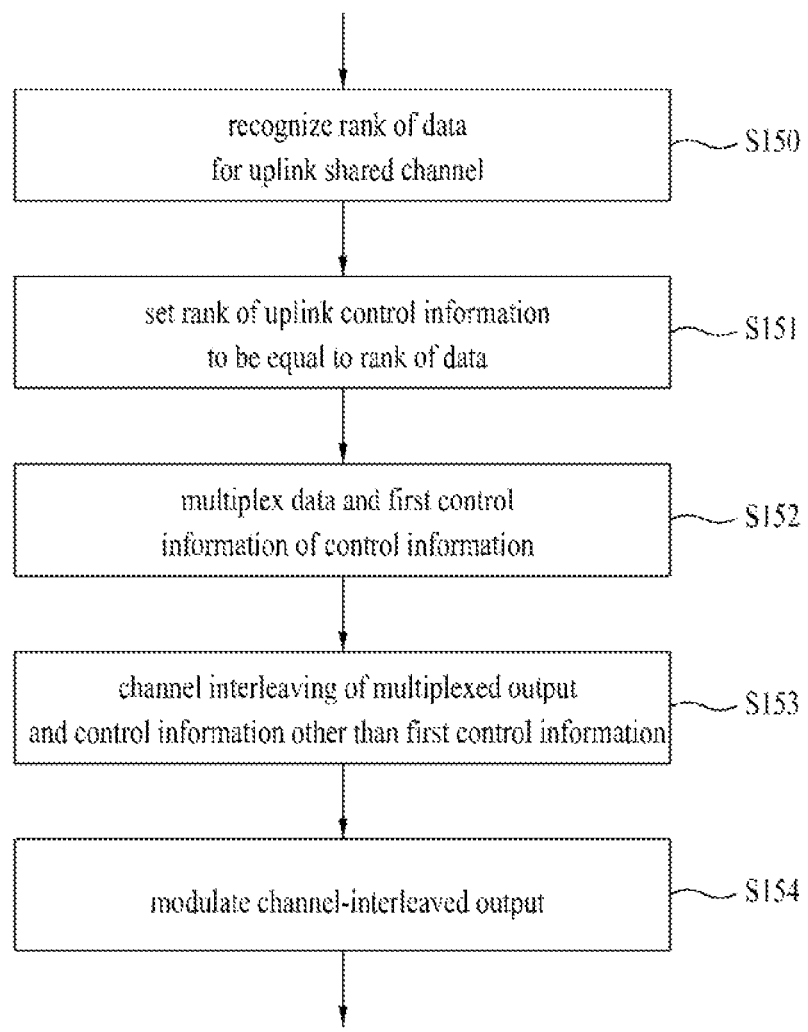
FIG. 15 is a flowchart for explaining an efficient method of multiplexing a data with a control channel on a UL shared channel.

FIG. 15 is a flowchart for explaining an efficient method of multiplexing a data with a control channel on a UL shared channel.

Referring to FIG. 15, a user equipment identifies a rank for a data of physical uplink shared channel (PUSCH) [S150]. And then, the user equipment sets a rank for an uplink control channel (in this case, the control channel means such an uplink control information (UCI) as CQI, ACK/NACK, RI and the like) with an identical rank, which is the same rank set to the data [S151]. And, the user equipment multiplexes the data and the control information [S152]. And then, after the data and the CQI is mapped by the time-first scheme, a channel interleaving can be performed to help the RI to be mapped into a designated RE and the ACK/NACK to be mapped in a manner of puncturing an RE situated in the vicinity of a DM-RS [S153].

Thereafter, the data and the control channel can be modulated to QPSK, 16QAM, 64QAM and the like according to an MCS table [S154]. In this case, the modulating step may move to a different position (for instance, the modulation block can be moved to a previous step of the multiplexing step of the data and the control channel). And, the channel interleaving can be performed by either a codeword unit or a layer unit.

Figure 16:
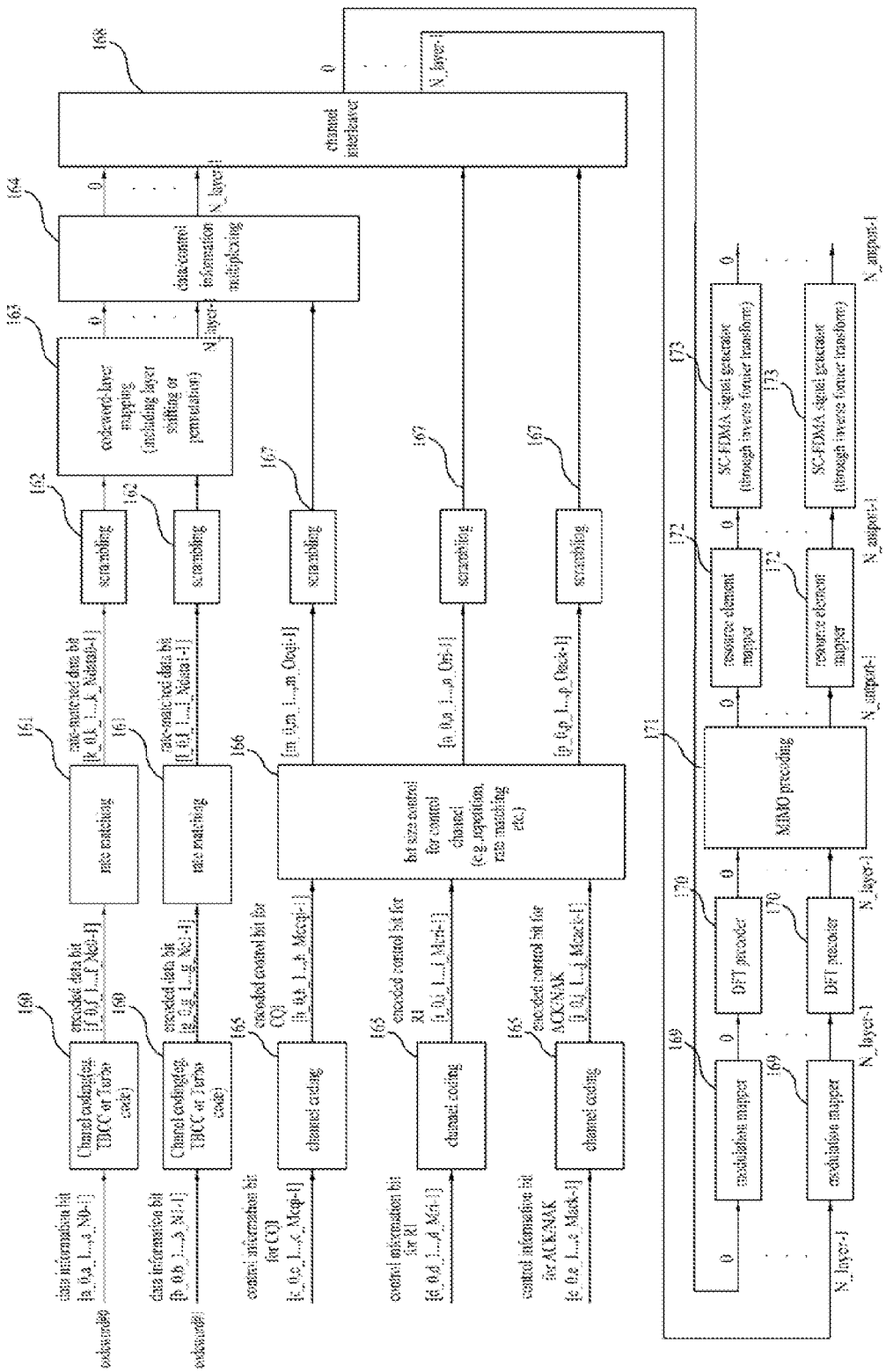
FIG. 16 is a diagram for explaining a generating method of a transmitting signal of a data and a control channel.

FIG. 16 is a block diagram for explaining a generating method of a transmitting signal of a data and a control channel. The position of each block is able to change according to a scheme to which applied thereto.

Assume that there are two code words. A channel coding is performed according to each of the code words [S160]. A rate matching is performed according to a given MCS level and a size of a resource [S161]. And, encoded bits can be scrambled by cell-specifically, UE-specifically, or codeword-specifically [S162].

Thereafter, a codeword to layer mapping is performed [S163]. In this process, an operation of a layer shift or a permutation can be included.

Figure 17:
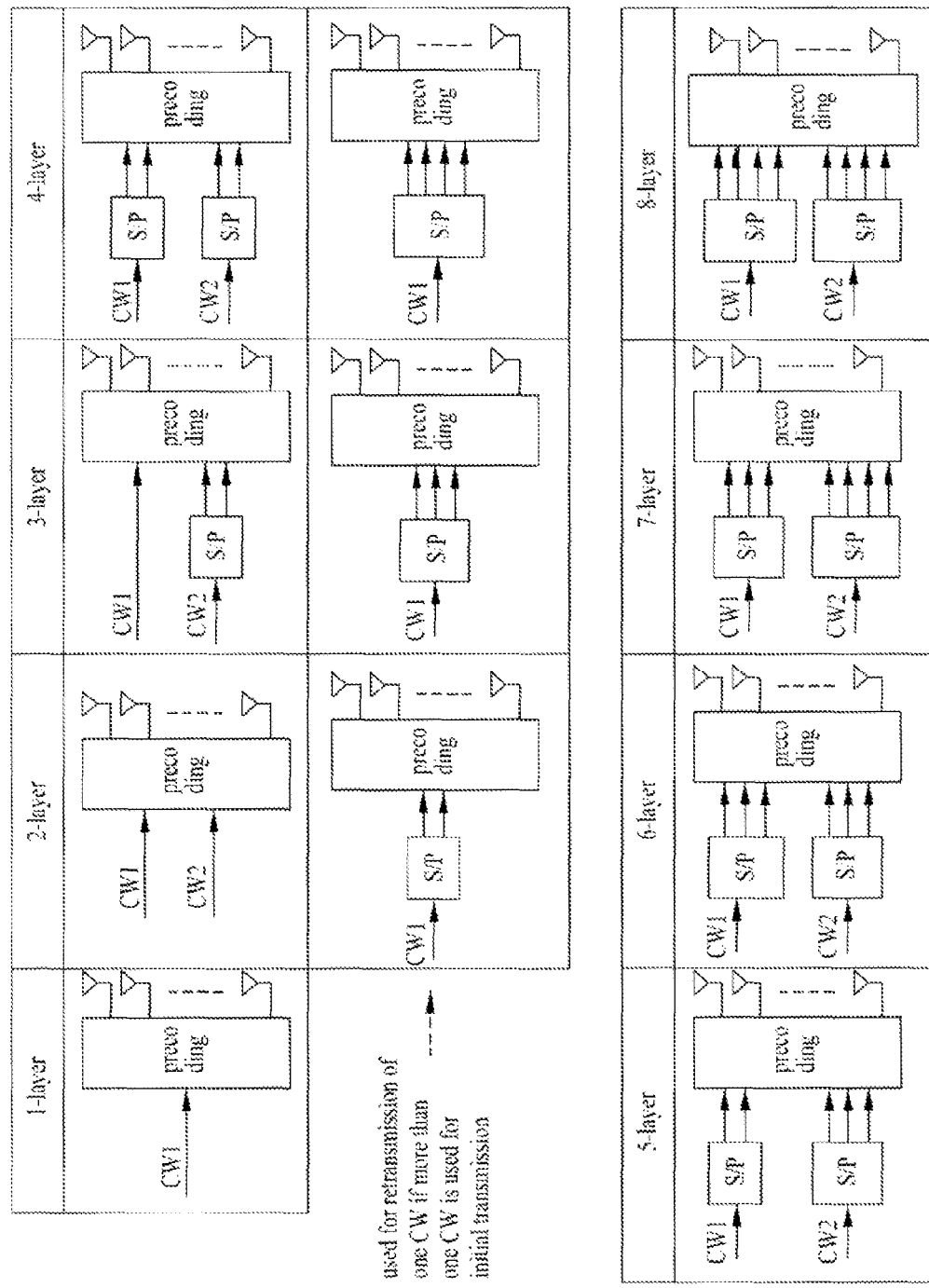
FIG. 17 is a diagram for explaining a mapping method of codeword to layer.

FIG. 17 is a diagram for explaining a mapping method of codeword to layer. The codeword to layer mapping can be performed using a rule depicted in FIG. 17. The position of a precoding in FIG. 17 may be different from that of a precoding in FIG. 13.

Such a control information as CQI, RI, and ACK/NACK is channel-coded according to a provided specification [S165]. In this case, the CQI, the RI, and the ACK/NACK can be coded using an identical channel code for all code words or can be coded using a different channel code according to a codeword.

And then, the number of encoded bit can be modified by a bit size control unit [S166]. The bit size control unit can be unified with a channel coding block [S165]. A signal outputted from the bit size control unit is scrambled [S167]. In this case, the scrambling can be performed by cell-specifically, layer-specifically, codeword-specifically, or UE-specifically.

The bit size control unit can operate as follows.

(1) The control unit identifies a rank (n_rank_pusch) of data for a PUSCH.

(2) A rank of a control channel (n_rank_control) is set to be identical with the rank of data (i.e., n_rank_control=n_rank_pusch), the number of bit for the control channel (n_bit_ctrl) expands its bit number in a manner of being multiplied by the rank of the control channel.

One method of performing this is to simply copy the control channel and repeat. In this case, the control channel may be an information level prior to a channel coding or may be a coded bit level after the channel coding. In particular, for instance, in case of a control channel [a0, a1, a2, a3], which is n_bitctrl=4 and the n_rank_pusch=2, an expanded bit number (n_ext_ctrl) may correspond to [a0, a1, a2, a3, a0, a1, a2, a3], which is 8 bits.

In case that the bit size control unit and a channel coding unit are configured to one unit, a coded bit can be generated in a manner of applying a channel coding defined by a legacy system (e.g., LTE Rel-8) and a rate matching.

In addition to the bit size control unit, a bit level interleaving can be performed to more randomize according to layers. Or, an interleaving can be performed in a modulated symbol level in order to provide an equivalent effect.

A CQI/PMI channel and data for 2 code words can be multiplexed by a data/control information multiplexer [S164]. And then, ACK/NACK information is mapped to both slots within a subframe in a manner of being mapped to the RE situated in the vicinity of UL DM-RS and a channel interleaver maps the CQI/PMI according to the time-first scheme [S168].

And, a modulation is performed according to each layer [S169], a DFT precoding [S170], a MIMO precoding [S171], an RE mapping [S172] and the like are sequentially performed. And, a SC-FDMA signal is then generated and transmitted via an antenna port [S173].

The functioning blocks are not limited to the position depicted in FIG. 16 and may change its position depends on a case. For instance, the scrambling blocks 162/167 can be positioned after a channel interleaving block. And, the codeword to layer matching block 163 can be positioned after the channel interleaving block 168 or a modulation mapper block 169.

The present invention explains a channel coding method of UCI for a case that the UCI such as a CQI, an ACK/NACK or an RI is transmitted on a PUSCH and the present invention explains a resource allocation and transmission method according to the channel coding method of UCI. In particular, the present invention is basically described on the basis of a transmission in a SU-MIMO environment. Yet, the present invention can be applied to a single antenna transmission, which may be a special case of the SU-MIMO, as well.

In case that UCI and data are currently transmitted on a PUSCH in a SU-MIMO environment, the UCI and the data are transmitted using the following scheme. A position of UCI on a PUSCH is explained in the following description.

CQI is concatenated with data and mapped to the rest of REs except the RE to which an RI is mapped by the time-first mapping scheme using a modulation order identical with the data and a constellation. In case of SU-MIMO, the CQI is transmitted in a manner of spreading to one codeword. The codeword to which the CQI is transmitted is a codeword having a high MCS level among two code words. In case that the MCS level is same, the CQI is transmitted to a codeword '0'. And, ACK/NACK is arranged in a manner of puncturing the concatenation of CQI and the data, which are already mapped to a symbol situated at the both sides of a reference signal. Since the reference signal is situated at $3^{rd}$ and $10^{th}$ symbol, a mapping starts from a lowest subcarrier of $2^{nd}$, $4^{th}$, $9^{th}$, $11^{th}$ symbol and continues to the top direction. In this case, an ACK/NACK symbol is mapped in the order of $2^{nd}$, $11^{th}$, $9^{th}$, $4^{th}$ symbol. The RI is mapped to a symbol situated at the side of the ACK/NACK and is mapped first among all informations (data, CQI, ACK/NACK, and RI) transmitted on a PUSCH. Specifically, the RI is mapped from a lowest subcarrier of $1^{st}$, $5^{th}$, $8^{th}$, $12^{th}$ symbol to the top direction. In this case, an RI symbol is mapped in the order of $1^{st}$, $12^{th}$, $8^{th}$, $5^{th}$ symbol. In particular, in case that information bit is 1 or 2 bits, the ACK/NACK and the RI are mapped by a QPSK scheme and the like using four corners of a constellation only. In case of the information bit having 3 or more bits, the ACK/NACK and the RI can be mapped using all constellations of a modulation order identical with the data. And, the ACK/NACK and the RI transmit same information using a same resource of a same position in all layers.

In the following description, a method of calculating the number of resource element for UCI on PUSCH is explained. First of all, the number of resource element for CQI and ACK/NACK (or RI) transmitted on PUSCH can be calculated based on Equation 1 and Equation 2 as follows.

$$Q' = \min \left( \left\lceil \frac{(O+L) \cdot M_{sc}^{PUSCH-initial}}{\sum_{r=0}^{C^{(x)}-1} K_r^{(x)}} \cdot \beta_{offset}^{PUSCH} \right\rceil, M_{sc}^{PUSCH} \cdot N_{symb}^{PUSCH} - \frac{Q_{RI}}{Q_m} \right)$$ [Equation 1]

In this case, 'O' indicates the number of CQI bit and 'L' indicates the number of CRC bit. In case that 'O' is less than 11 or equal to 11, 'L' is '0'. In case that 'O' is greater than 12 or equal to 12, 'L' is 8. It may be able to express as $Q_{CQI} = Q_m \cdot Q'$. In this case, the $Q_m$ indicates a modulation order. $Q_{RI}$ indicates the number of bit of a coded RI. In case that an RI transmission does not exist, it corresponds to $Q_{RI} = '0'$. $\beta_{offset}^{PUSCH}$ indicates an offset value and can be used to control a coding rate of CQI. It can be provided as $\beta_{offset}^{PUSCH} = \beta_{offset}^{CQI}$. $M_{sc}^{PUSCH-initial}$ indicates a band scheduled to transmit an initial PUSCH of a transport block and may be represented as the number of subcarrier. $N_{symb}^{PUSCH-initial}$ indicates the number of SC-FDMA symbol to transmit an initial PUSCH of the identical transport block. It can be represented as $N_{symb}^{PUSCH-initial} = (2 \cdot (N_{symb}^{UL} - 1) - N_{SRS})$. $N_{symb}^{UL}$ indicates the number of SC-FDMA symbol per slot and $N_{SRS}$ is '0' or '1'. If a user equipment is configured to transmit PUSCH and SRS in a subframe for an initial transmission or if PUSCH resource allocation for the initial transmission overlaps with a cell-specific SRS subframe and a band, the $N_{SRS}$ corresponds to '1'. Otherwise, it corresponds to '0'.

$$\sum_{r=0}^{C-1} K_r$$

indicates the number of bit (including CRC) of a data payload to transmit an initial PUSCH of the identical transport block. C indicates a total number of code block, r indicates a number of code block, $K_r$ indicates the number of bit of a code block r. $M_{sc}^{PUSCH-initial}$, C, and $K_r$ are obtained from an initial PDCCH for the identical transport block. ⌈n⌉ indicates a ceiling function and returns a smallest integer among the number greater than N. A min (a, b) returns a smaller number between a and b.

$$Q' = \min \left( \left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right)$$ [Equation 2]

In this case, 'O' indicates the number of bit of ACK/NACK (or RI).

For the ACK/NACK, it corresponds to $Q_{ACK}=Q_m \cdot Q'$. $\beta_{offset}^{PUSCH}$ indicates an offset value and can be used to control a coding rate of the ACK/NACK. It can be provided as $\beta_{offset}^{PUSCH}=\beta_{offset}^{HARQ-ACK}$.

For the RI, it corresponds to $Q_{RI}=Q_m \cdot Q'$. $\beta_{offset}^{PUSCH}$ indicates an offset value and can be used to control a coding rate of the RI. It can be provided as $\beta_{offset}^{PUSCH}=\beta_{offset}^{RI}$.

In the following description, a channel coding method for UCI, which is transmitted on a PUSCH, is explained. First of all, in case of CQI, if a payload size is less than 11 bits or equal to 11 bits, an RM (Reed-Muller) coding using a following Table 1 is applied to an input sequence (i.e., information data), $o_0, o_1, o_2, \ldots, o_{O-1}$ and then an output sequence of 32 bits is generated. And, if the payload size of CQI is greater than 11 bits, a TBCC (tail biting convolutional coding) can be applied after a CRC of 8 bits is attached.

Meanwhile, ACK/NACK transmitted on PUSCH and a channel coding of RI are explained in the following description. If a size of information data of the ACK/NACK and the RI is 1 bit, in other word, if an input sequence corresponds to $[o_0^{UCI}]$, a channel coding is performed according to a modulation order as shown in Table 2. And, if the size of information data of the ACK/NACK and the RI is 2 bit, in other word, if the input sequence corresponds to $[o_0^{UCI} o_1^{UCI}]$, the channel coding is performed according to the modulation order as shown in Table 3. In particular, $o_0^{UCI}$ corresponds to the ACK/NACK or the RI data for codeword '0', $o_1^{UCI}$ corresponds to the ACK/NACK or the RI data for codeword '1' and $o_2^{UCI}$ corresponds to $(o_0^{UCI}+o_1^{UCI})$mod 2 in Table 3. In Table 2 and Table 3, 'x' means a value of '1' and 'y' means a repetition of a previous value.

Yet, if the size of the information data of ACK/NACK or RI is greater than 3 bits, equal to 3 bits, less than 11 bits or equal to 11 bits, a 32-bits output sequence is generated by applying an RM (Reed-Muller) coding using a following Table 1.

TABLE 2

| $Q_m$ | Encoded HARQ-ACK/RI |
|---|---|
| 2 | $[o_0^{UCI} \, y]$ |
| 4 | $[o_0^{UCI} \, y \, x \, x]$ |
| 6 | $[o_0^{UCI} \, y \, x \, x \, x \, x]$ |

TABLE 3

| $Q_m$ | Encoded HARQ-ACK/RI |
|---|---|
| 2 | $[o_0^{UCI} \, o_1^{UCI} \, o_2^{UCI} \, o_0^{UCI} \, o_1^{UCI} \, o_2^{UCI}]$ |
| 4 | $[o_0^{UCI} \, o_1^{UCI} \, x \, x \, o_2^{UCI} \, o_0^{UCI} \, x \, x \, o_1^{UCI} \, o_2^{UCI} \, x \, x]$ |
| 6 | $[o_0^{UCI} \, o_1^{UCI} \, x \, x \, x \, x \, o_2^{UCI} \, o_0^{UCI} \, x \, x \, x \, x \, o_1^{UCI} \, o_2^{UCI} \, x \, x \, x \, x]$ |

In particular, in case of the RM (Reed-Muller) coding using Table 1, an output data $b_0, b_1, b_2, b_3, \ldots, b_{B-1}$ can be represented as a following Equation 3 and B corresponds to 32.

$$b_i = \sum_{n=0}^{O-1}(o_n \cdot M_{i,n}) \bmod 2 \qquad \text{[Equation 3]}$$

Lastly, in order to map an UCI coded to B bit, i.e., ACK/NACK or RI data into a Q' number of resource element, which is calculated based on Equation 1 and Equation 2, a rate matching can be performed according to Equation 4.

$$q_i = b_{i \bmod B}, \, i=0,1,\ldots,Q_m \times Q'-1 \qquad \text{[Equation 4]}$$

In this case, $Q_m$ indicates the number of bit per modulated symbol. It corresponds to 2, 4, 6 in QPSK, 16QAM, 64QAM, respectively.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 0 | 1 | 0 | 0 | 0 | 1 | 1 | 1 | 1 |
| 24 | 1 | 1 | 1 | 1 | 0 | 1 | 1 | 1 | 1 | 0 | 1 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

In the following description, an efficient method of transmitting an UCI is described.

First of all, precoding codebook information on a PUCCH and a UCI transmission are explained. Currently, regarding a transmission of the precoding codebook, its index information, and the UCI transmission on a PUCCH, there exists an agreement as follows.

(1) In case of 2 Tx and 4 Tx, since $W_1$ corresponds to a unit matrix, it is not reported by a separate transmission. $W_2$ re-uses a codebook of a legacy system (e.g., LTE Rel-8).

(2) A UE-specific code book subset according to the principle of the legacy system (e.g., LTE Rel-8) can be supported by an enhanced system (e.g. LTE Rel-10).

(3) In case that $W_1$ and RI are transmitted in a same subframe in a PUCCH format 1-1 of the legacy system (e.g., LTE Rel-8), it expands in the enhanced system (LTE Rel-10) as follows. In particular, 1) a sub sampling of the codebook can be achieved in accordance with a latest codebook design, 2) a precoding matrix W is determined by 2 subframes to which the RI is reported thereto lastly. 3) a reporting of the precoding matrix W consists of two kinds. The reporting consists of a first reporting Report 1 ($W_1$ and RI are jointly encoded) and a second reporting Report 2 (wideband CQI and wideband codebook $W_2$. If a codebook size of the $W_2$ is '1', the $W_2$ is not reported).

(4) A PUCCH format 2-1 of the legacy system (LTE Rel-8) expands in the enhanced system (LTE Rel-10) as follows.

1) a precoding matrix W is determined by 3 subframes to which the RI is reported thereto lastly.

2) a reporting format consists of 3 kinds. Report 1, report 2, and report 3 are described as follows. The report 1 reports an RI and a precoder type indication (PTI) of 1 bit. The report 2 reports $W_1$ in case that the PTI is '0' and reports a wideband CQI and a wideband $W_2$ in case that the PTI is '1'. The report 3 reports a wideband CQI and a wideband $W_2$ in case that the PTI is '0' and reports a subband CQI and a subband $W_2$ in case that the PTI is '1'. Meanwhile, the PTI is assumed to be '1' in case of 2 Tx and 4 Tx and then a separate signaling is not performed.

(5) An expansion of PUCCH mode 1-1 of the legacy system (LTE Rel-8) in an enhanced system (LTE Rel-10) for the W, which is determined based on an RI reported in an immediately previous subframe, is described as follows.

1) for each rank, a subset of a codebook C1 and a subset of C2 can be used in a manner that a total size of CQI, $W_1$, and $W_2$ is not exceed maximum 11 bits. For each rank, the subset of a codebook C1 and the subset of C2 are fixed and then may not be modified. And, for each rank, the subset of a codebook C1 and the subset of C2 can be designed jointly or separately. For simple instance, a subset of a common phase available to every beam angle, which is different from each other, may be different with each other.

In the following description, a method of efficiently multiplexing a plurality of data and UCI on a PUSCH is explained. For clarity, although a UL-SCH transmission is described on the basis of a transport block, the transport block and a codeword correspond to a data block equivalent with each other. Hence, the transport block and the codeword may be commonly called a (UL-SCH) data block. In particular, in the following description, a codeword can be replaced by a corresponding transport block and vice versa, if there is no specific mention.

Figure 18:
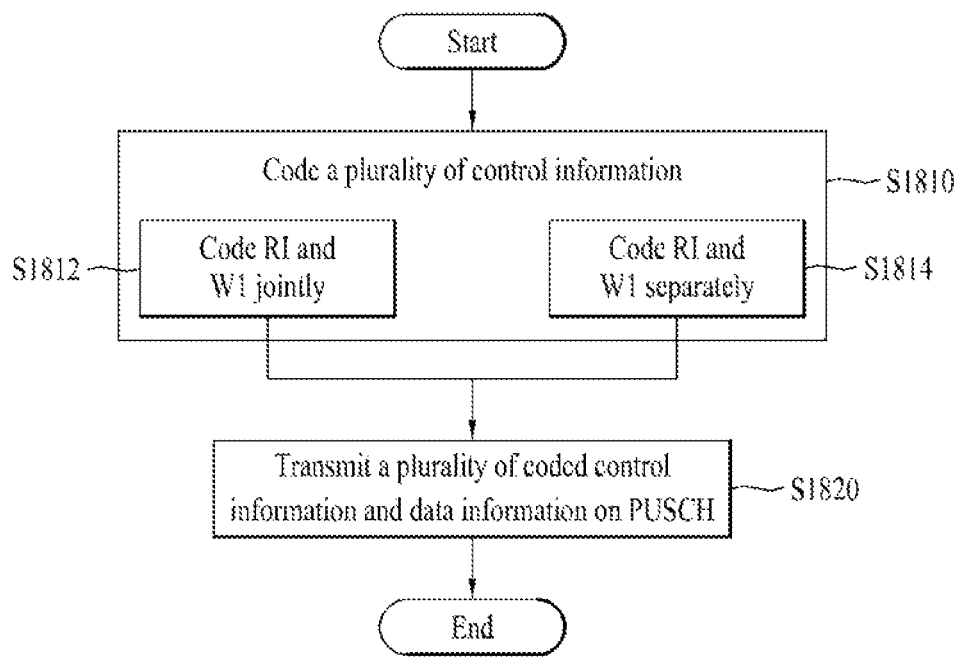
FIG. 18 is a flowchart simply indicating a flow of control information transmitting method in relation to the present invention.

FIG. 18 is a flowchart simply indicating a flow of a control information transmitting method in a wireless communication system in relation to the present invention.

First of all, a processor 2410 is able to code a plurality of control information [S1810]. In this case, a plurality of the control information corresponds to UCI information and may include RI, CQI, ACK/NACK information, and PMI information. The PMI may be able to include PMI ($W_1$) for a whole frequency bands and the PMI ($W_2$) for a sub frequency band.

In relation to a coding of the control information, the coding may include both cases. A first case may correspond to a case that an RI and $W_1$ are jointly coded [S1812] and a second case may correspond to the case that the RI and $W_1$ are separately coded. The present invention can be applied to both of the cases.

An RF module 2430 may be able to transmit a plurality of coded control information and data information to a base station on PUSCH [S1820]. In this case, a plurality of the control information and the data information can be transmitted in a manner of being mapped to a resource block of the PUSCH.

In case that a conventional UCI is transmitted on a PUSCH, since a consideration on a PMI did not exist, a method of transmitting the PMI is not defined yet. And, in a carrier aggregation situation, in case that the PMI according to a multiple CC and UCI are simultaneously multiplexed to a PUSCH, since the increase of the UCI information size due to the multiple CC becomes more considerable by adding the information of the PMI, it is necessary to have an efficient method of coding and a method of transmitting to reduce a corresponding problem.

In case of transmitting UCI information and precoding matrix information to PUSCH at the same time, a following method can be applied. First of all, there exists a method of jointly coding an RI and a wideband PMI ($W_1$) among the precoding matrix information. Secondly, there exists a method of separately coding the RI and the $W_1$.

First of all, a first method is explained in case that UCI and precoding matrix information are simultaneously transmitted to PUSCH.

An RI and $W_1$ among the precoding matrix information (PMI) can be jointly coded and may be mapped to a mapping position to which the RI is previously mapped within an RB of PUSCH in an UCI multiplexing operation.

In case of calculating an RE, which is assigned to a jointly coded codeword of the RI and the $W_1$ information, a size (0) of information bit may apply a value resulted from adding the size of information bit of the RI and the size of the information bit of the $W_1$.

In this case, in case of a CA that a total of the information bit size of the RI and the $W_1$ corresponds to 5 component carriers, a maximum payload size may exceed 22 bits.

In this case, a channel coding may be encoded in a manner of dividing by 3 RM codes as a first method. In case of encoding with the 3 RM codes, the information bit size assigned to each of the RM codes needs to be configured identically, if possible. For instance, if the information bit size corresponds to 24 bits, 8 bits are assigned to each of the RM codes, respectively. If the information bit size corresponds to 23 bits, first and second RM codes are assigned 8 bits, respectively. And, third RM code is assigned 7 bits.

And, in case that a total of the information bit size of the RI and that of the $W_1$ exceeds 22 bits, a TBCC can be used as a second method when the information bit size exceeds a specific size. The information bit size to which the TBCC applies may correspond to 12-bit or higher or may correspond to 23-bit. In case of the TBCC, it may be able to encode in a manner of adding CRC to the information bit prior to the encoding. In this case, the size of the CRC may be one of 4, 6, or 8. For instance, if the size of the CRC is 8 bits when the CRC is added, the equation for calculating 8-bit CRC of CQI can be directly applied to the equation for calculating the CRC. And, if the CRC is 4 bits, the equation for calculating the CRC may correspond to one of the 3 equations in Equation 5.

$$g_4(D)=D^4+D^3+D^2+D+1$$

$$g_4(D)=D^4+D^3+1$$

$$g_4(D)=D^4+D+1 \quad \text{[Equation 5]}$$

In the following description, a second method that UCI and the precoding matrix information are simultaneously transmitted to PUSCH is explained. The second method corresponds to a method of separately encoding an RI and the precoding matrix $W_1$.

The UCI is multiplexed by encoding an RI and $W_1$ separately. In case of multiplexing the UCI, a calculation on an RE can be performed for the RI and the $W_1$, respectively. In this case, the calculation on the RE allocated to the $W_1$ is performed based on the equation of the RI. A beta offset value of the $W_1$ may be identical to the beta offset value of the RI or may be different from the beta offset value of the RI. In particular, the beta offset of the $W_1$ may have a different value in a single layer transmission and a multiple layer transmission as well. The beta offset of a sub band $W_2$ can be identically applied as well. And, the $W_1$ can be transmitted to all layers in a manner of being time aligned like the RI does. In particular, identical information can be transmitted to all layers.

The $W_1$ can be transmitted to a layer to which a specific transport block belongs thereto in a manner of spreading like a CQI does. In this case, the $W_1$ can be transmitted to a transport block to which the CQI is transmitted or can be transmitted to a transport block, which includes no CQI. And, the $W_1$ can be transmitted to a transport block of high MCS level or can be transmitted to a transport block, which has a biggest TBS (transport block size). And, the $W_1$ can be transmitted to a transport block designated to a UL grant.

In relation to information bit size '0', it may be able to calculate by applying a total value resulted from adding the information bit size of the RI and the $W_1$. In this case, the number of RE allocated to each of the RI and the $W_1$ may use the value resulted from dividing the number of RE, which is calculated by adding the total, by a ratio of the RI and the $W_1$.

In case of multiplexing UCI by separately encoding RI and $W_1$, a position where the $W_1$ is mapped to RB of PUSCH can be applied as follows. The following description is explained with reference to FIG. 19 to FIG. 23.

Figure 19:
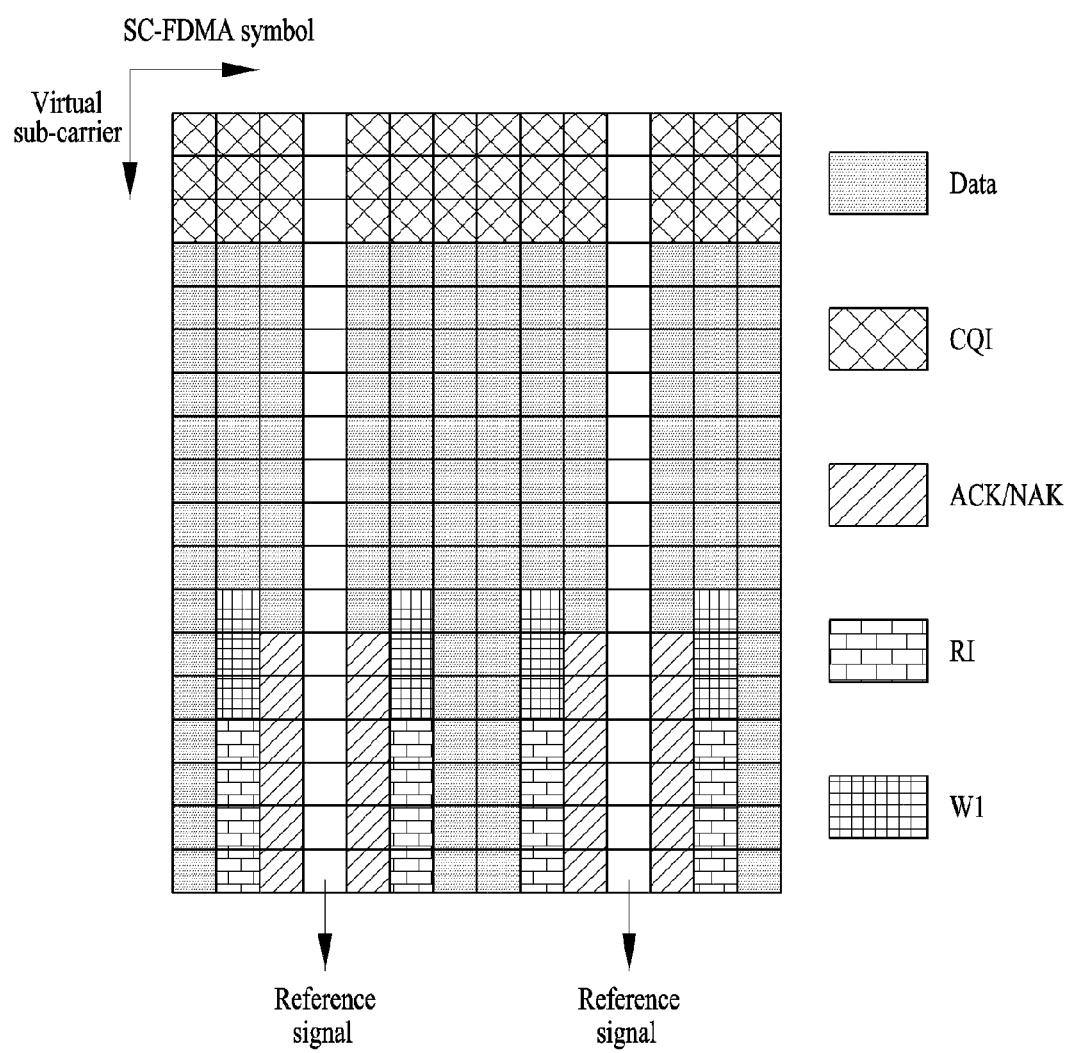
FIG. 19 is a diagram of a $1^{st}$ embodiment for mapping a resource block to W1 in case that a PMI (W1) for RI and a total frequency band is separately coded.

(1) First of all, referring to FIG. 19, the W/is mapped to a position to which a conventional RI is mapped.

Referring to FIG. 19, an RI is mapped to a position to which the RI is mapped on conventional PDSCH. $W_1$ can be mapped in succession after the RI is mapped. In particular, the $W_1$ can be mapped to $2^{nd}$, $6^{th}$, $9^{th}$, and $13^{th}$ symbol to which the RI is mapped. And, the $W_1$ can be mapped in accordance with a mapping scheme of the RI after an encoded codeword of the RI and the encoded codeword of the $W_1$ are concatenated with each other. This is also performed as shown in FIG. 19.

Figure 20:
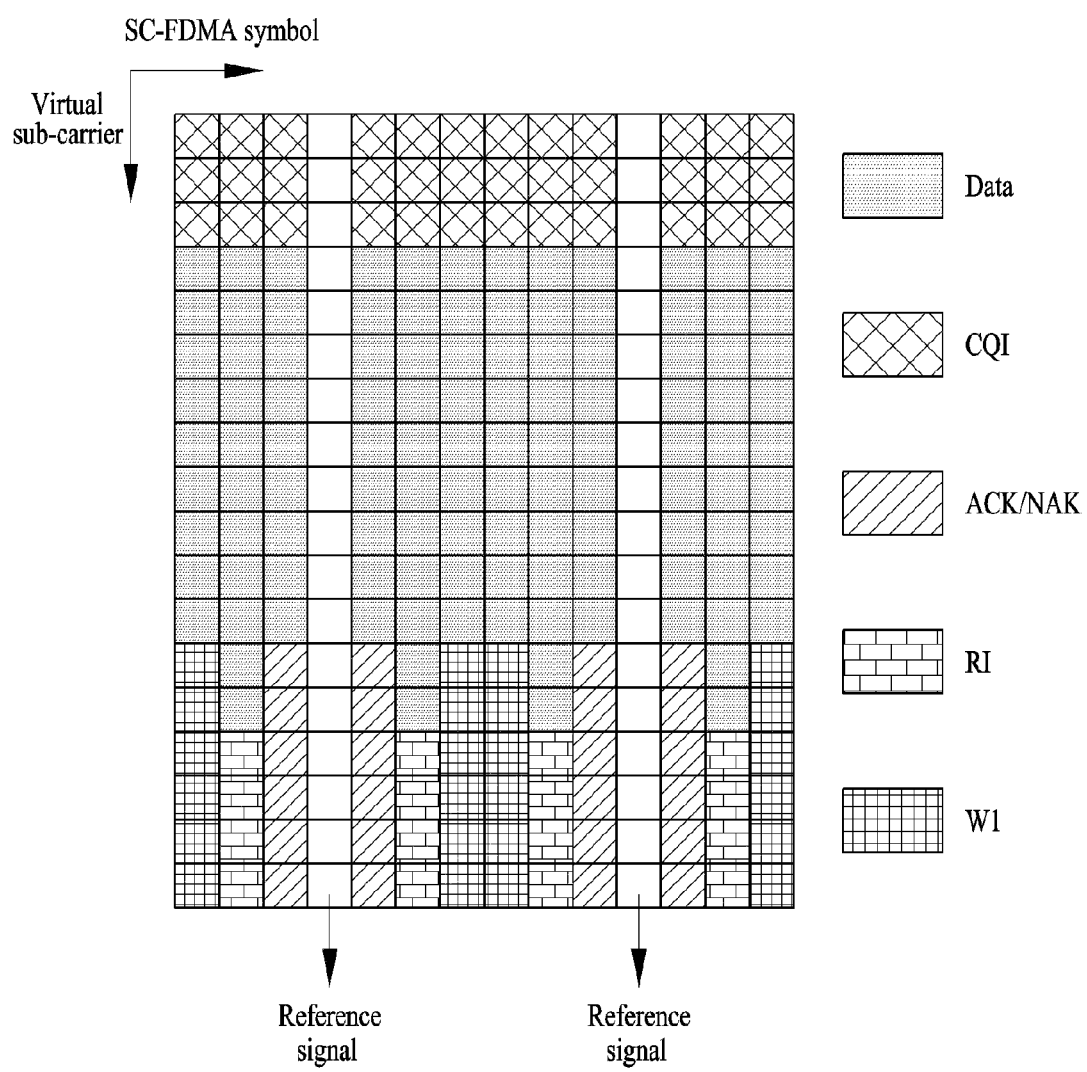
FIG. 20 is a diagram of a $2^{nd}$ embodiment for mapping a resource block to W1 in case that a PMI (W1) for RI and a total frequency band is separately coded

(2) Referring to FIG. 20, the $W_1$ can be mapped to a position next to the position to which the RI is mapped.

Referring to FIG. 20, the RI is mapped to $2^{nd}$, $6^{th}$, $9^{th}$ and $13^{th}$ symbol, which are the positions of RB of a conventional PUSCH. In particular, the RI is mapped to a position next to the symbol to which ACK/NACK is mapped. In this case, the $W_1$ can be mapped to a remaining position, in other word, a position next to the position to which the RI is mapped, which corresponds to $1^{st}$, $7^{th}$, $8^{th}$, and $14^{th}$ symbol.

Figure 21:
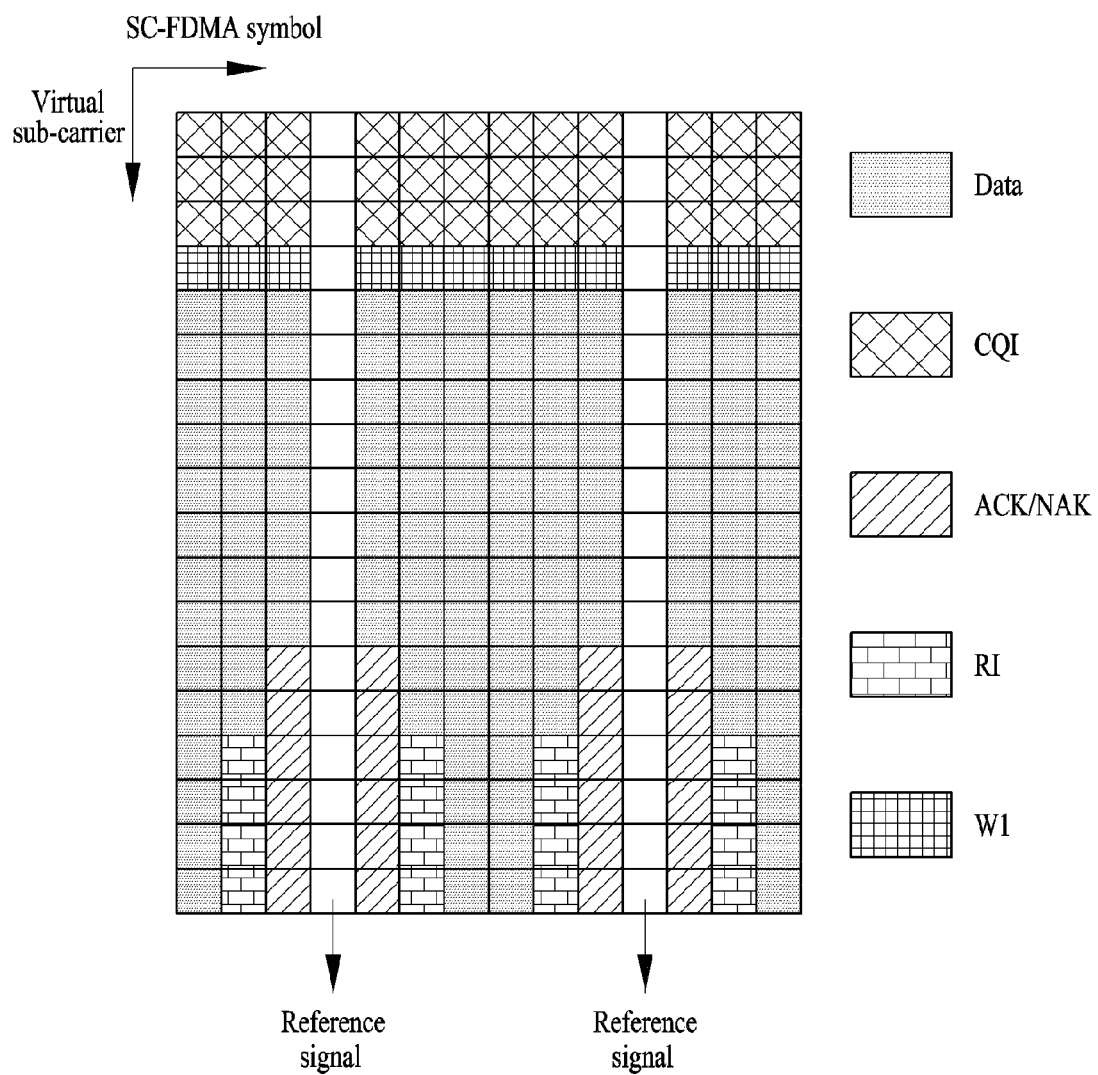
FIG. 21 is a diagram of a $3^{rd}$ embodiment for mapping a resource block to W1 in case that a PMI (W1) for RI and a total frequency band is separately coded

(3) Referring to FIG. 21, the $W_1$ can be mapped to a resource after the resource to which CQI is mapped in a manner of being concatenated with the CQI by a time-first order.

Referring to FIG. 21, the RI is mapped to a conventional mapping position in RB of PUSCH and the $W_1$ can be positioned to a resource after the resource to which CQI is mapped by a time-first order. In this case, the $W_1$ can be mapped after the CQI is mapped. Selectively, the $W_1$ is mapped first before the CQI is mapped and then the CQI can be mapped later.

Figure 22:
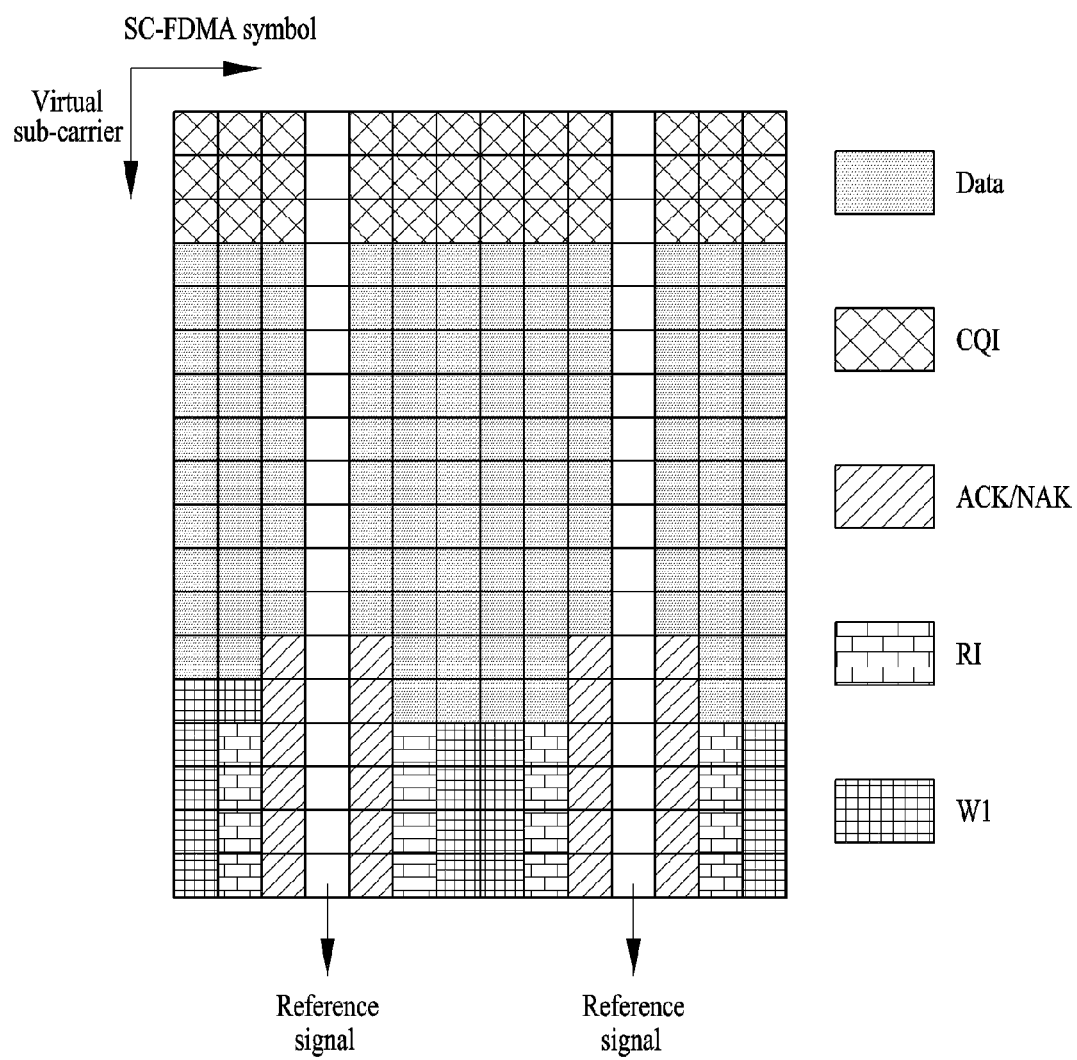
FIG. 22 is a diagram of a $4^{th}$ embodiment for mapping a resource block to W1 in case that a PMI (W1) for RI and a total frequency band is separately coded.

(4) Referring to FIG. 22, the $W_1$ can be sequentially mapped to the RE to which the RI and ACK/NACK are not mapped from a lowest subcarrier of an RB.

Referring to FIG. 22, first of all, the ACK/NACK and the RI are mapped to a conventional mapping position in an RB. In particular, the ACK/NACK is mapped to $3^{rd}$, $5^{th}$, $10^{th}$, and $12^{th}$ symbol, which correspond to the next positions of a reference signal. The RI is mapped to a position, which is the next position to which the ACK/NACK is mapped. After the RI and the ACK/NACK are mapped, the $W_1$ can be sequentially mapped to the RE to which the RI and the ACK/NACK are not mapped from the bottom of the RB. In this case, the $W_1$ can be sequentially mapped from a lowest subcarrier of the RB.

Figure 23:
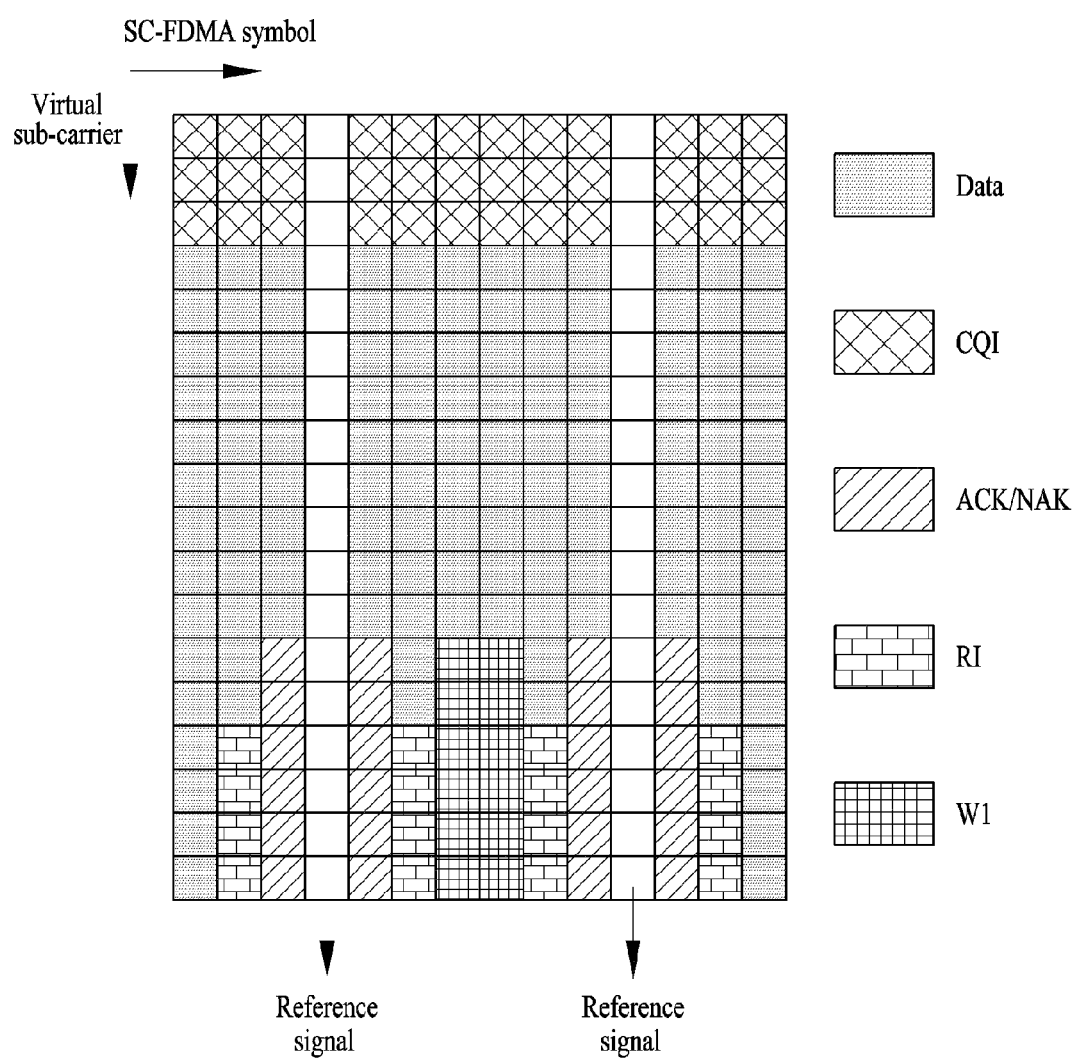
FIG. 23 is a diagram of a $5^{th}$ embodiment for mapping a resource block to W1 in case that a PMI (W1) for RI and a total frequency band is separately coded.

(5) Referring to FIG. 23, the $W_1$ can be mapped to only the two symbols of the RB situated between the positions to which the RI is mapped.

Referring to FIG. 23, first of all, the ACK/NACK and the RI are mapped to a conventional mapping position in an RB. Thereafter, the $W_1$ can be mapped to $7^{th}$ and $8^{th}$ symbol, which correspond to the symbols situated between $6^{th}$ and $9^{th}$ symbols among the symbols to which the RI is mapped.

According to the present invention, besides the method of jointly/separately coding the RI and the W, the $W_1$ can be jointly coded with CQI.

In this case, since a QoS level of the $W_1$ is higher than the CQI, the QoS level of the $W_1$ can be increased by performing a precoding on the $W_1$. In this case, in order to increase the QoS level, 1) a repetition coding on the $W_1$ can be performed by a precoding. In this case, the precoding can be performed by repeating the $W_1$ by a bit unit or by repeating the $W_1$. 2) In order to increase the QoS level, a simplex coding can be performed on the $W_1$. 3) In order to increase the QoS level, a coding scheme applied to 2-bits ACK/NACK and the RI can be used for the $W_1$ as a precoding.

In the following description, a sub band $W_2$ among the PMI is explained.

The $W_2$ is processed together with CQI in general. And, the CQI and the $W_2$ can be mapped to a conventional mapping position to which the CQI is mapped.

The $W_2$ can be jointly coded with the CQI as well. In this case, an applying channel coding is performed based on a method of the CQI. In particular, an RM code is used until the information bit size is not exceeded 11 bits. In case that the information bit size is exceeded 11 bits, a TBCC is applied in a manner of adding an 8-bit CRC.

Meanwhile, the $W_2$ can be separately coded with the CQI. In this case, a coding applied to the $W_2$ may be performed based on a method of the CQI. Hence, the RM code is used until the information bit size is not exceeded 11 bits. In case that the information bit size is exceeded 11 bits, a TBCC can be applied in a manner of adding a CRC.

In case that the CQI and the $W_2$ are separately coded, two coded code words concatenate alternately by one symbol or one bit. For simple instance, if a coded codeword of the CQI corresponds to $c_0, c_1, \ldots, c_{n-1}$ and the coded codeword of the $W_2$ corresponds to $w_0, w_1, \ldots, w_{m-1}$, a data concatenating the two code words may correspond to $c_0, w_0, c_1, w_1 \ldots$. In this case, $c_i$, i=0, 1, ..., n-1 and $w_i$, i=0, 1, ..., m-1 may be a bit or a symbol.

And, in case that the CQI and the $W_2$ are separately coded, in other word, in case that there exist two coded code words, after the RE allocated to each of the two coded code words is separately calculated, a rate matching may be applied to each of the code words, respectively.

And, in case that the CQI and the $W_2$ are separately coded, an information bit size (0) can be calculated by a total of the information bit of the CQI and the $W_2$ when a calculation is performed on the RE, which is allocated to the two coded code words.

Figure 24:
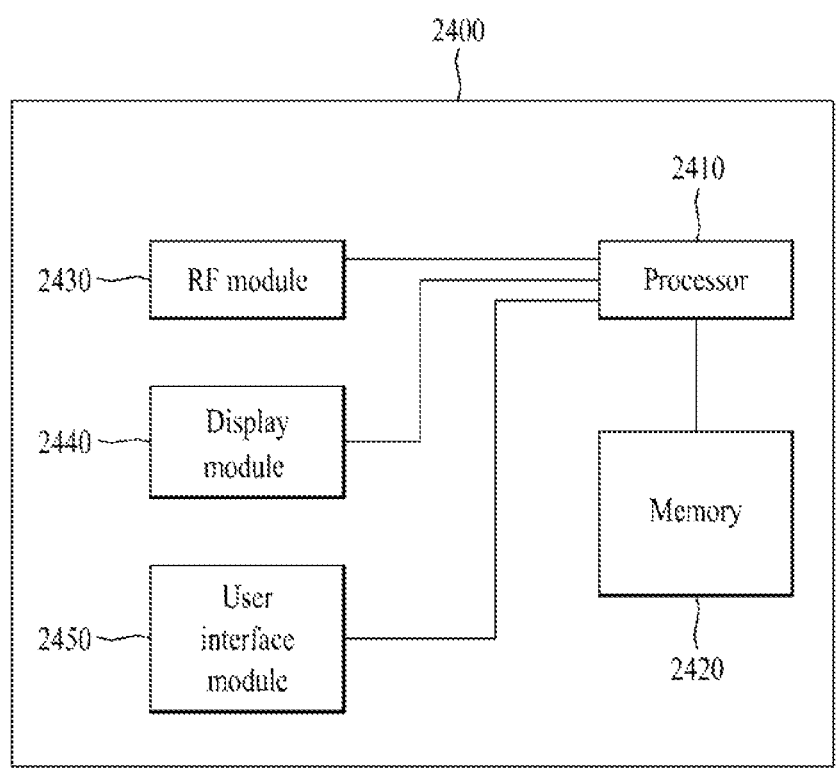
FIG. 24 is an exemplary block diagram of a user equipment according to one embodiment of the present invention.

FIG. 24 is an exemplary block diagram of a user equipment according to one embodiment of the present invention.

Referring to FIG. 24, a communication device 2400 may include a processor 2410, a memory 2420, an RF module 2430, a display module 2440, and a user interface module 2450.

Since the communication device 2400 is depicted for clarity of description, prescribed module(s) may be omitted in part. The communication device 2400 may further include necessary module(s). And, a prescribed module of the communication device 2400 may be divided into subdivided modules. A processor 2410 is configured to perform an operation according to the embodiments of the present invention illustrated with reference to drawings. In particular, the detailed operation of the processor 2410 may refer to the former contents described with reference to FIG. 1 to FIG. 11.

The memory 2420 is connected with the processor 2410 and stores an operating system, applications, program codes, data, and the like. The RF module 2430 is connected with the processor 2410 and then performs a function of converting a baseband signal to a radio signal or a function of converting a radio signal to a baseband signal. To this end, the RF module 2430 performs an analog conversion, amplification, a filtering, and a frequency up conversion, or performs processes inverse to the former processes. The display module 2440 is connected with the processor 2410 and displays various kinds of informations. And, the display unit 2440 can be implemented using such a well-known component as an LCD (liquid crystal display), an LED (light emitting diode), an OLED (organic light emitting diode) display and the like, by which the present invention may be non-limited. The user interface module 2450 is connected with the processor 2410 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a base station and a terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. And, the 'terminal' may be substituted with such a terminology as a user equipment (UE), a mobile station (MS), a mobile subscriber station (MSS), and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invent may be applicable to a wireless communication system. Specifically, the present invention may be applicable to a wireless mobile communication device used for a cellular system.

What is claimed is:
1. A method of transmitting information by a user equipment (UE) in a wireless communication system, the method comprising:
coding a plurality of control information including a precoding matrix index (PMI) for a whole frequency band, ACK/NACK information and a rank indicator (RI); and transmitting a plurality of the coded control information and a data information mapped to a data channel on a subframe including a plurality of symbols, wherein the PMI for the whole frequency band and the rank indicator (RI) are separately coded, wherein the RI is mapped to a $2^{nd}$, $6^{th}$, $9^{th}$ and $13^{th}$ symbol in the subframe, the ACK/NACK information is mapped to a $3^{rd}$, $5^{th}$, $9^{th}$ and $11^{th}$ symbol and the data information is mapped to $1^{st}$ and $14^{th}$ symbol, wherein the separately coded PMI, the ACK/NACK information and the data information are mapped to at least subcarriers having a same frequency location as specific subcarriers to which the RI is mapped, and wherein the separately coded PMI is mapped to only a 7th and $8^{th}$ symbol in the subframe.

2. The method of claim 1, wherein the plurality of control information further includes a channel quality indicator (CQI), and wherein the PMI for the whole frequency band and the CQI are jointly coded.

3. The method of claim 2, wherein a PMI for a sub frequency band and the CQI are jointly coded.

4. The method according to claim 2, wherein a repetition coding on the PMI is performed by a precoding.

5. The method of claim 1, wherein reference signals are mapped to a $4^{th}$ and $11^{th}$ symbol in the subframe, and wherein the separately coded PMI for the whole frequency band is sequentially mapped in the frequency-rising direction.

6. The method of claim 1, wherein the data channel comprises a physical uplink shared channel (PUSCH).

7. A communication device comprising:

a transmitter; and a processor operatively connected to the transmitter and configured to:

code a plurality of control information including a precoding matrix index (PMI) for a whole frequency band, ACK/NACK information and a rank indicator (RI); and transmit a plurality of the coded control information and a data information mapped to a data channel on a subframe including a plurality of symbols, wherein the PMI for the whole frequency band and the rank indicator (RI) are separately coded, wherein the RI is mapped to a $2^{nd}$, $6^{th}$, $9^{th}$ and $13^{th}$ symbol in the subframe, the ACK/NACK information is mapped to a $3^{rd}$, $5^{th}$, $9^{th}$, and $11^{th}$ symbol and the data information is mapped to $1^{st}$ and $14^{th}$ symbol, wherein the separately coded PMI, the ACK/NACK information and the data information are mapped to at least subcarriers having a same frequency location as specific subcarriers to which the RI is mapped, and wherein the separately coded PMI is mapped to only a 7th and $8^{th}$ symbol in the subframe.

8. The communication device of claim 7, wherein the plurality of control information further includes a channel quality indicator (CQI), and wherein the processor is configured to jointly code the PMI for the whole frequency band and the CQI.

9. The communication device of claim 8, wherein a PMI for a sub frequency band and the CQI are jointly coded.

* * * * *